United States Patent [19]

Citron

[11] Patent Number: 4,807,151

[45] Date of Patent: Feb. 21, 1989

[54] ELECTRICAL TECHNIQUE FOR CORRECTING BRIDGE TYPE MASS AIR FLOW RATE SENSOR ERRORS RESULTING FROM AMBIENT TEMPERATURE VARIATIONS

[75] Inventor: Stephen J. Citron, West Lafayette, Ind.

[73] Assignee: Purdue Research Foundation, West Lafayette, Ind.

[21] Appl. No.: 850,511

[22] Filed: Apr. 11, 1986

[51] Int. Cl.⁴ ............... G01M 15/00; G01F 1/68; F02D 41/34

[52] U.S. Cl. ............... 364/510; 364/431.05; 364/557; 364/571.03; 73/118.2; 73/204.15; 73/204.19; 123/494

[58] Field of Search ........... 364/510, 557, 571, 431.05; 73/1 R, 766, 861, 861.03, 861.01, 27 R, 204, 118.2; 123/494

[56] References Cited

U.S. PATENT DOCUMENTS

| Re. 31,906 | 6/1985 | Oyama et al. | 73/204 |
|---|---|---|---|
| 4,057,755 | 11/1977 | Piesche | 73/27 R |
| 4,063,447 | 12/1977 | Mathison | 73/27 R |
| 4,102,199 | 7/1978 | Tsipouras | 364/557 |
| 4,173,148 | 11/1979 | Yamada et al. | 73/766 |
| 4,192,005 | 3/1980 | Kurtz | 73/766 |
| 4,399,515 | 8/1983 | Gross | 364/571 |
| 4,562,731 | 1/1986 | Nishimura et al. | 73/204 |
| 4,576,039 | 3/1986 | Muto et al. | 73/204 |
| 4,593,667 | 6/1986 | Sasaki et al. | 123/494 |
| 4,649,745 | 3/1987 | Kondo et al. | 73/204 |
| 4,683,858 | 8/1987 | Sato et al. | 123/494 |

FOREIGN PATENT DOCUMENTS 2113849 12/1982 United Kingdom ............... 364/581

OTHER PUBLICATIONS

Glenn A. Gurtcheff & Lawrence D. Hazelton, "Mass Airflow Sensor: Ambient Temperature Compensation Design Considerations", presented at the International Congress & Exposition of the Society of Automotive Engineers, Detroit, Michigan, Feb. 24–28, 1986 (8 pages) TSI Technical Bulletin TB 5 Hot Film and Hot Wire Anemometry Theory and Application (13 pages). TSI Technical Bulletin TB 16 Temperature Compensation of Thermal Sensors (6 pages).
Rudolf Saver, Hot Wire Air Mass Motor-A Now Air Flow Meter for Gasoline Fuel Injection Systems, SAE Technical Paper Series, Feb. 25–29, 1980.

Primary Examiner—Parshotam S. Lall
Assistant Examiner—Ellis B. Ramirez
Attorney, Agent, or Firm—Barnes & Thornburg

[57] ABSTRACT

A mass flow rate sensor for providing an output signal related to mass flow rate past the sensor includes a bridge circuit for generating a first mass flow rate-related signal containing temperature-related errors and mass flow rate-related errors, a resistance for generating a second signal providing temperature error correction, and a resistance for generating a third signal providing mass flow rate error correction. Electrical circuitry operatively couples the bridge circuit and resistances together to provide the output signal. A method for providing an output signal related to mass flow rate includes the steps of generating a first mass flow rate-related signal containing temperature-related errors and mass flow rate-related errors, generating a second signal providing temperature error correction, generating a third signal providing mass flow rate error correction, and combining the first, second and third signals together to provide the output signal.

24 Claims, 9 Drawing Sheets

ELECTRICAL TECHNIQUE FOR CORRECTING BRIDGE TYPE MASS AIR FLOW RATE SENSOR ERRORS RESULTING FROM AMBIENT TEMPERATURE VARIATIONS

This invention relates to mass flow rate sensors and more particularly to an improved method and circuit for a metal foil bridge type mass air flow rate sensor with so-called TCOMP temperature compensation for compensating for errors introduced by changes in ambient air temperature.

Mass air flow rate sensors are increasingly used in the automotive industry to measure the mass air intake into an internal combustion engine. This measurement is then used by an engine controller, in many cases a microprocessor-based system, to optimize the performance of the engine, particularly with regard to maximizing fuel efficiency and minimizing pollution. It is therefore important that the mass air flow rate measurement be as accurate as technology permits.

One widely used mass air flow rate sensor is the hot film anemometer, often called a bridge type mass air flow rate sensor. In a bridge type mass air flow rate sensor, an electrical heating circuit is used to maintain a metal foil at a particular constant temperature. The foil is placed in the path of the engine's intake air flow. As the air flows past the foil, heat is removed from the foil. When the system is at equilibrium, the amount of heat lost from the foil must equal the amount of electrical energy supplied to the foil. Thus, by sensing the electrical energy supplied to the foil, an output signal can be produced which is indicative of the mass air flow rate.

A problem with the basic circuit for bridge type mass air flow rate sensors is that as the ambient temperature of the engine s intake air changes, so too will the amount of heat lost from the metal foil change for a given mass air flow rate. Thus, the electrical energy needed to maintain the metal foil at the constant temperature changes as the ambient air temperature changes This introduces an error into the measurement of mass air flow rate, since the output signal will be related not only to the mass air flow rate, but also to the ambient air temperature.

One prior art technique of compensating for changes in ambient air temperature is based on the principle that if the difference between ambient air temperature and the temperature at which the metal foil is maintained changes linearly with respect to changes in ambient air temperature, the errors introduced by the changes in ambient air temperature will be minimized. This scheme, called TCOMP, incorporates an ambient air temperature sensing element in the bridge type mass air flow rate sensor. When the ambient air temperature changes, the ambient air temperature sensing element reacts by changing the particular constant temperature at which the metal foil is maintained so that the difference between the constant temperature and ambient air temperature varies linearly with ambient air temperature changes.

However, the amount of heat transferred from the metal foil does not change linearly with changes in ambient air temperature, but varies according to a higher order function. Further, the TCOMP scheme assumes that the thermal properties of air remain constant regardless of temperature. In fact, they do not. As a result, although the TCOMP scheme achieves a significant reduction in the errors introduced by changes in ambient air temperature, errors still remain.

It is an object of this invention to provide improved compensation for changes in ambient air temperature in a bridge type mass air flow rate sensor It is also an object of this invention to provide a bridge type mass air flow rate sensor wherein the errors introduced by changes in ambient air temperature are reduced beyond the reduction capable of being achieved by TCOMP temperature compensation alone.

Another object of this invention is to improve temperature compensation in a bridge type mass air flow rate sensor by compensating for errors which result from non-linear changes in heat transfer as ambient air temperature changes.

A mass flow rate sensor for providing an output signal related to mass flow rate past the sensor comprises first means for generating a first mass flow rate-related signal, the first signal containing temperature-related errors and mass flow rate-related errors, second means for generating a second signal providing temperature differential error correction, third means for generating a third signal providing mass flow rate error correction, and means for operatively coupling the first, second and third means together to provide the output signal.

A method for providing an output signal related to mass flow rate comprises generating a first mass flow rate-related signal, the first signal containing temperature-related errors and mass flow rate-related errors, generating a second signal providing temperature differential error correction, generating a third signal providing mass flow rate error correction, and combining the first, second and third signals to provide the output signal.

Additional features and advantages of the invention will become apparent to those skilled in the art upon consideration of the following detailed description of a preferred embodiment exemplifying the best mode of carrying out the invention as presently perceived. The detailed description particularly refers to the accompanying figures in which:

FIG. 15 is a graph of simulation results showing the relationship of correction gain determined with an analog implementation of this invention to bridge voltage as applied to a TCOMP compensated bridge type mass air flow rate sensor with a TCOMP of 13° C.;

Figure 22:
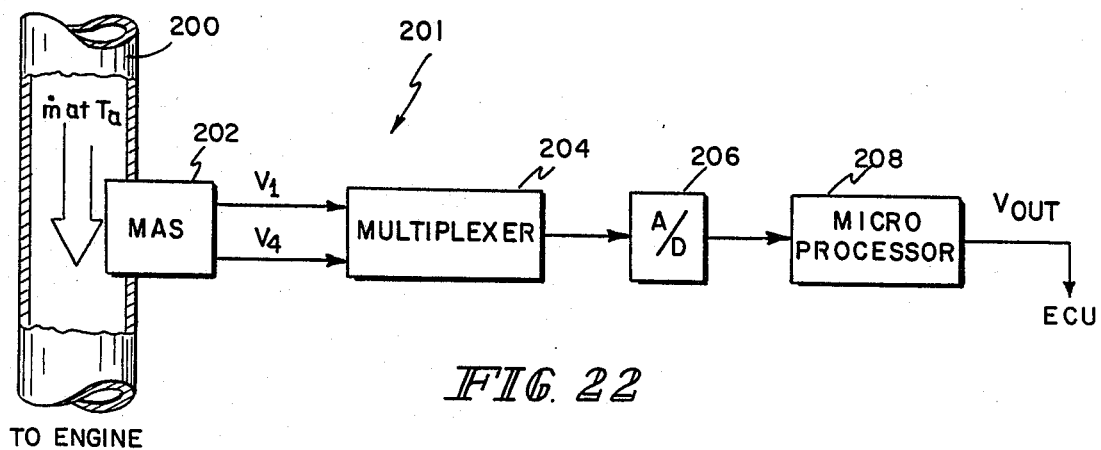
Figure 21:
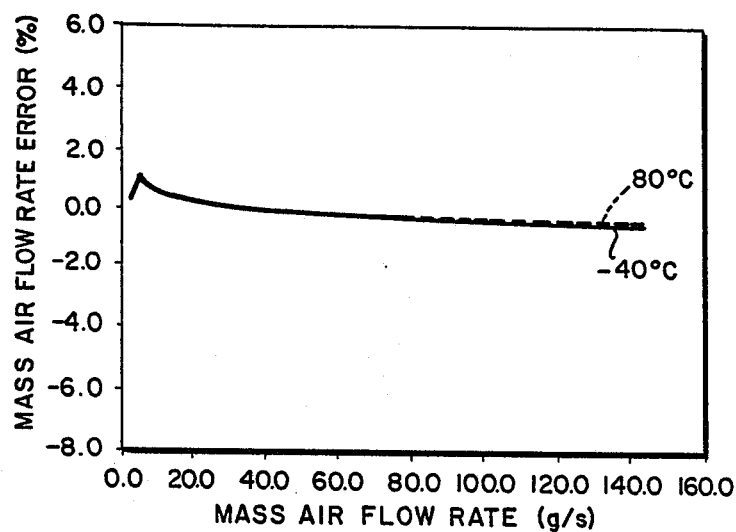

FIG. 21 is a graph of simulation results showing the mass flow rate error for a TCOMP compensated bridge type mass air flow rate sensor for ambient air temperatures of −40° C. and 80° C. wherein the TCOMP is 13° C. which utilizes a digital implementation of the temperature compensation scheme of this invention; and FIG. 22 is a block diagram of a system showing a TCOMP compensated bridge type mass air flow rate sensor with a digital implementation of the temperature compensation scheme of this invention.

Figure 1:
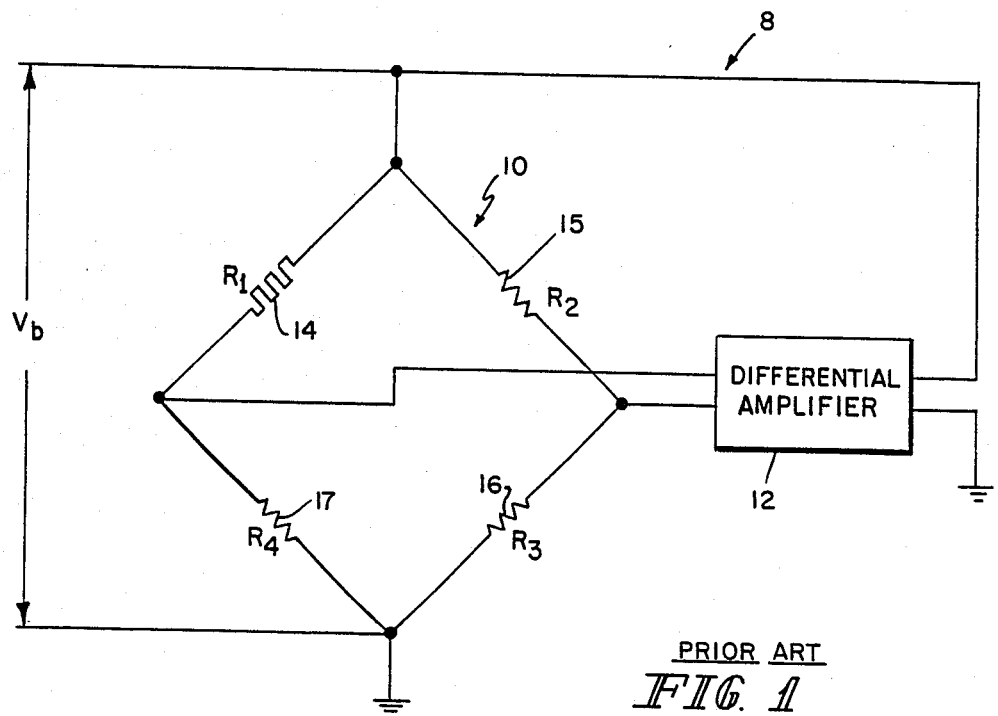
FIG. 1 is a schematic of a simplified circuit for a prior art bridge type mass air flow rate sensor.

To aid in understanding the hot film anemometer, or bridge type mass air flow rate sensor 8, the simple circuit shown in FIG. 1 is considered. In describing the anemometer, the words film and foil are used, but a description of the device as a hot wire anemometer is equally appropriate. The circuit is constructed from a wheatstone bridge 10 and a high gain differential amplifier 12. The amplifier 12 converts the voltage difference at its inputs to an output current to the bridge 10. The wheatstone bridge is made up of four resistors 14, 15, 16 and 17 having resistances, $R_1$, $R_2$, $R_3$ and $R_4$, respectively. Resistor 14 comprises a foil and will be referred to as foil 14. Resistors 15, 16 and 17 can be considered, for now, as standard resistors of constant value.

The resistors 15 and 16 that form the right, or reference, side of the bridge, have much larger resistances than the resistors 14 and 17 on the left, or sensing, side. This limits the amount of current which flows through the right side of the bridge. Resistors 15 and 16 are equal in value.

With the resistances $R_2$ and $R_3$ equal, the bridge is balanced when $R_1$ and $R_4$ are equal. The resistance $R_1$ of foil 14 varies with its temperature. Therefore, the bridge is balanced when the temperature of foil 14 is such that its resistance $R_1$ is equal to $R_4$. Thus the foil 14 temperature at which the bridge balances is fixed by choice of $R_2$, $R_3$ and $R_4$.

If the circuit is in equilibrium and the bridge 10 is slightly unbalanced, a voltage difference will exist across the input terminals of the amplifier 12. The magnitude of the bridge imbalance is dependent upon the amplifier gain. As the gain approaches infinity, the bridge imbalance approaches zero, as will be shown. The difference voltage will cause the amplifier 12 to supply current to the bridge 10 and thus to the foil 14. The current flowing through the foil 14 will provide electrical heating equal to the cooling caused by the air flowing across the foil 14.

If the air flow rate increases, the cooling due to the air flow will also increase, and the temperature of foil 14 will start to drop. The lower temperature of foil 14 produces a lower foil resistance $R_1$, causing the bridge 10 to become more unbalanced. The difference voltage input to the amplifier 12 then increases, and the current flowing through the foil 14 increases, resulting in sufficient electrical heating to offset the increased cooling and return the bridge 10 to balance.

An output signal from the mass air flow rate sensor 8 is obtained from the current flowing through the foil 14 which is related to the mass flow rate of air flowing across the foil 14. This current, multiplied by the resistance in the left leg of the bridge, $(R_1+R_4)$, yields the bridge voltage $V_b$. Resistance $R_4$ is constant and the resistance of the foil 14, $R_1$, remains essentially constant throughout the mass air flow rate operating range as it is determined by the requirements of bridge balance. Thus, the bridge voltage $V_b$ varies only with the current flowing through the foil 14 and is therefore suitable as the output of the mass air flow rate sensor 8.

It should be noted that the engine compartment of an automobile is a very noisy electrical environment and care must be taken to ensure an adequate signal-to-noise ratio. To minimize noise problems, the bridge voltage $V_b$ may be transformed into an AC signal which is much less sensitive to electrical noise.

A quantitative steady state model of the mass air flow rate sensor is developed to provide further insight into its operation. The model will help to illustrate more completely how the mass air flow sensor works, and how various outside factors such as variations in ambient air temperature affect the operation of the device.

The model is based on the principle already discussed, that when the mass air flow sensor 8 is in equilibrium, the electrical energy supplied to the foil 14 must be equal to the heat energy lost by the foil 14. This principle, called an energy balance, is expressed in equation form below $$Q(\dot{m}) = I_1^2 R_1 \quad (1)$$

where $I_1$ Current delivered to the foil 14;
$\dot{m}$ Mass flow rate of air over the foil 14;
$Q(\dot{m})$ Total rate of heat loss from the foil 14—indicated to depend upon the mass flow rate of air over the foil 14; and
$R_1$ Resistance of the foil 14.

The development of the steady state model is made up of two basic parts. A heat transfer model is needed to Predict the heat transfer Q, and a model of the electrical circuit is needed to predict the foil 14 current $I_1$, and with it the bridge output voltage, $V_b$.

As air flows over the foil 14, heat energy is removed from it. This cooling effect is offset by the electrical energy input. At steady state these quantities must be equal. Therefore $$Q(\dot{m}) = I_1 R_1 \quad (2)$$

The first step in development of the steady state model is to find the relation between the mass flow rate $\dot{m}$ and the heat transfer Q. The heat transfer out of the foil 14 is assumed to be composed of convective and radiative heat transfer. Each of these is discussed individually.

The convective heat transfer is the heat transfer that occurs as a direct result of air flowing over the foil 14. The foil 14 is modeled as a flat plate of uniform temperature in parallel flow. The general expression for convective transfer out of the plate can be written as $$q_c = h(\dot{m}) A_f (T_l - T_a) \quad (3)$$

where $A_f$ Effective area of foil 14;
$h(\dot{m})$ Average heat transfer coefficient (Assuming constant thermal properties of air, the heat transfer coefficient will be a function of only the mass flow rate);
$q_c$ Convective heat transfer rate;
$T_a$ Ambient air temperature; and
$T_l$ Temperature of the foil 14.

During operation, heat is also lost from the foil 14 by radiation. The radiative heat transfer is equal to the net exchange of radiation between the foil 14 and its surroundings. Since an intake air flow tube (100 in FIG. 18; 200 in FIG. 22) completely surrounds the foil 14 and the air flowing through the tube can be assumed not to affect the radiation process, the radiation heat transfer can be written $$q_r = es A_f (T_l^4 - T_s^4) \quad (4)$$

$q_r$ Radiative heat transfer;
e Emissivity of the foil;
s Stefan-Boltzmann constant; and
$T_s$ Surface temperature of the flow tube.

The total heat transfer is the sum of the convective and radiative heat transfer.

$$Q = q_c + q_r \quad (5)$$

Combining Equations 3, 4, and 5 yields $$Q(\dot{m}) = h(\dot{m}) A_f (T_l - T_a) + es A_f (T_l^4 - T_s^4) \quad (6)$$

Equation 6 provides a model of the heat transfer process affecting the foil 14. Through use of the model, it can be shown that convection is the dominant mode of heat transfer.

Figure 2:
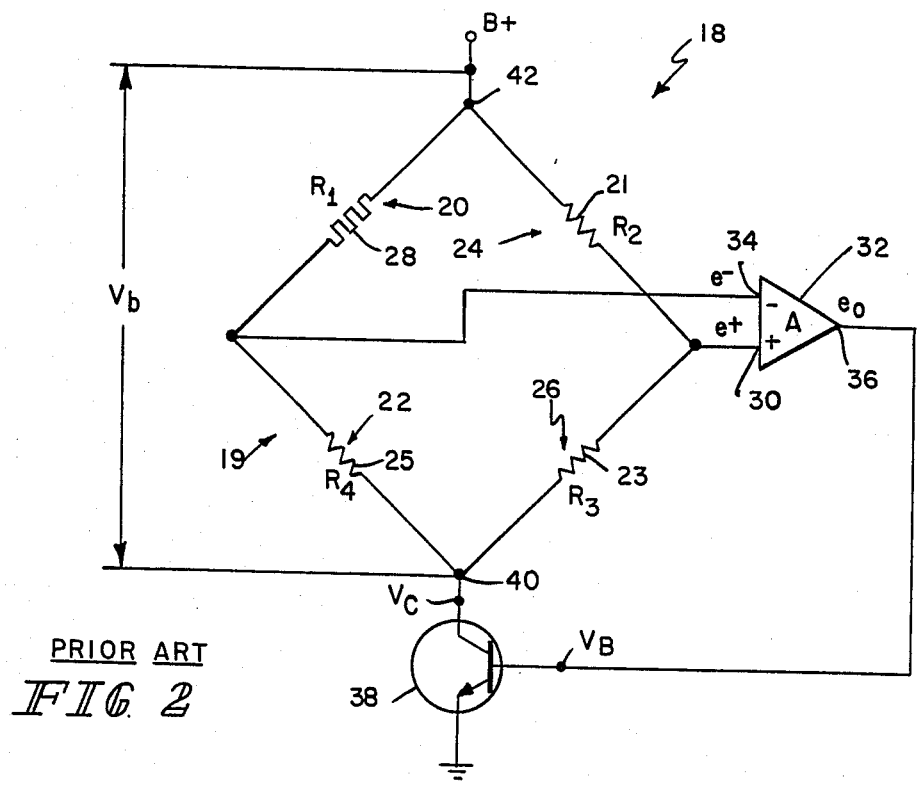
FIG. 2 is a schematic of a simplified circuit for a Prior art bridge type mass air flow rate sensor.

FIG. 2 illustrates schematically a simplified circuit for a prior art bridge type mass air flow rate sensor 18. The mass air flow rate sensor 18 has a bridge circuit 19. Bridge circuit 19 illustratively comprises first and second series connected legs 20, 22 which are connected in parallel with third and fourth series connected legs 24, 26. First leg 20 illustratively comprises a metal foil element 28 which has a resistance $R_1$. Second, third and fourth legs 22, 24, 26, respectively, illustratively comprise resistors 25, 21, 23, respectively, which have resistances of $R_4$, $R_2$, and $R_3$, respectively. For Purposes of continuity, the resistances of bridge circuit 19 are given the same designations, $R_1$, $R_2$, $R_3$, $R_4$, as the resistances of bridge circuit 10 in FIG. 1.

A junction of legs 24, 26 is connected to the + input terminal 30 of a differential amplifier 32. A junction of legs 20, 22 is connected to the − input terminal 34 of differential amplifier 32. An output terminal 36 of differential amplifier 32 is connected to the base of a transistor 38.

The emitter of transistor 38 is connected to ground and the collector of transistor 38 is connected to the junction 40 of legs 22, 26 of bridge circuit 19. The junction 42 of legs 20, 24 of bridge circuit 19 is connected to the positive terminal B+ of a source of electrical power, not shown.

The simple electrical circuit shown in FIG. 2 is used to develop the relationships between the resistance $R_1$ of the foil 28, the voltage $V_b$ of the bridge 19 and the current $I_1$ flowing through the foil 28. The following variables are defined:

$R_l$ Resistance of the foil 28;
$T_l$ Temperature of the foil 28;
$I_l$ Current flowing through the foil 28;
$V_b$ Bridge voltage taken across the parallel connection of series connected legs 20, 22 and series connected legs 24, 26;
$v_B$ Voltage at the base of the transistor 38 with respect to ground;
$v_C$ Voltage at the collector of the transistor 38 with respect to ground;
$e^+$ Input voltage at terminal 30 of op-amp 32 with respect to ground;
$e^-$ Input voltage at terminal 34 of the op-amp 32 with respect to ground;
A op-amp 32 gain; and
$e_o$ Output voltage at the output terminal 36 of the op-amp 32 with respect to ground.

The resistances $R_2$, $R_3$, $R_4$ of resistors 21, 23, 25, respectively, are all assumed to be constant at this The equations which characterize the operation of the circuit shown in FIG. 2 are now found. The voltage $e^-$ is equal to the voltage $v_C$ plus the voltage drop across $R_4$. The voltage drop across $R_4$ can be found from a voltage division of $V_b$. The voltage $e^-$ can thus be written as $$e^- = v_C + \frac{R_4}{R_1 + R_4} V_b \quad (7)$$

Similarly, the voltage $e^+$ is $$e^+ = v_C + \frac{R_3}{R_2 + R_3} V_b \quad (8)$$

The output voltage, $e_o$, of the op-amp 32 may then be written as a function of the input differential voltage and the oP-amp gain, yielding $$e_o = A(e^+ - e^-) \quad (9)$$

Using Equations 7 and 8 and the fact that $e_o 32 v_B$, Equation 9 may be solved for the bridge output voltage to give $$V_b = \frac{v_B}{A\left[\frac{R_3}{R_2 + R_3} - \frac{R_4}{R_1 + R_4}\right]} \quad (10)$$

The operation of the transistor is such that the voltage at the base $v_B$, hence $e_o$, is essentially constant. Equation 10 provides the desired relation between the bridge voltage $V_b$ and the foil resistance $R_1$.

For use in the energy balance of Equation 2, the current flowing through the foil 28 must be found. The current $I_l$ may be obtained from the bridge voltage $V_b$ and the resistances $R_1$ and $R_4$ $$I_1 = \frac{v_b}{R_1 + R_4} \quad (11)$$

All the quantities needed to form the energy balance on the foil 28 are now available except for two. The relation between the foil resistance $R_1$ and the foil temperature $T_l$ must be specified, as must the characteristics of the output voltage to frequency converter (not shown). The relation between foil temperature and resistance is assumed to be known and thus may be written $$R_1 = R_1(T_l) \quad (12)$$

The voltage to frequency converter is a voltage controlled oscillator (vco) and its linear input-output relation is given below.

$$f = c_1 V_b + c_2 \quad (13)$$

where
 $c_1$, $c_2$ Device constants;
 f The output frequency; and
 $V_b$ The bridge voltage.

The six equations which describe the model, Equations 2, 6, 10, 11, 12 and 13 are renumbered and listed below $$R_1 = R_1(T_1) \quad (14)$$

$$Q(m) = h(m)A_f(T_l - T_a) + es A_f(T_l^4 - T_s^4) \quad (15)$$

$$Q(m) = I_1^2 R^1 \quad (16)$$

$$V_b = I_1(R_1 + R_4) \quad (17)$$

$$V_b = \frac{v_B}{A\left[\frac{R_3}{R_2 + R_3} - \frac{R_4}{R_1 + R_4}\right]} \quad (18)$$

$$f = c_1 V_b + c_2 \quad (19)$$

The relations listed above provide six equations for the six unknowns f, $V_b$, $R_1$, $T_1$, $I_1$ and Q, given m, $T_a$ and $T_s$. Before proceeding to outline a general solution procedure for these equations, some further insight can be provided. Equation 18 gives $V_b$ as a function of $v_B$ (the voltage at the base of the transistor with respect to ground), A (the op-amp gain) and the four resistances that form the bridge. Of these, $R_2$, $R_3$, $R_4$, A and $v_B$ have been assumed constant, leaving $R_1$ as unknown.

The gain of an op-amp is very large and is often assumed to be infinite. This assumption is now used to simplify the circuit model.

If the op-amp gain is allowed to approach infinity, then for $V_b$ to remain finite, the following equation must hold.

$$\frac{R_3}{R_2 + R_3} = \frac{R_4}{R_1 + R_4} \quad (20)$$

After cross multiplication Equation 20 yields the bridge balance equation.

$$R_1 = R_4 \frac{R_2}{R_3} \quad (21)$$

Thus the steady state foil resistance $R_1$ is fixed by the resistances $R_2$, $R_3$, $R_4$. If the resistance of the foil 28 is fixed, then the temperature of the foil 28, $T_l$, is also fixed by Equation 14. By choice of $R_2$, $R_3$, and $R_4$, the temperature at which the foil 28 will operate, i.e., the temperature of the foil 28 at which it has a resistance which balances the bridge 19, can be selected.

If the ambient air temperature $T_a$ and the surface temperature, $T_s$, of the mass air flow sensor 18 flow tube (not shown) are known, then Equation 15 gives the total heat transfer out of the foil 28, Q, as a function of the mass flow rate $\dot{m}$. If the total heat transfer is known as a function of the mass flow rate, then the energy balance, Equation 16, can be used, along with the foil resistance $R_1$, to calculate the current $I_l$ flowing through the foil 28.

$$I_1 = \left[\frac{Q(\dot{m})}{R_1}\right]^{\frac{1}{2}} \quad (22)$$

Combining Equations 17 and 22 provides the bridge voltage $$V_b = \left[\frac{Q(\dot{m})}{R_1}\right]^{\frac{1}{2}} (R_1 + R_4) \quad (23)$$

Examination of this equation shows that the bridge voltage is only a function of Q, $R_1$ and $R_4$ With the two resistances constant, cf. Equation 21, the bridge voltage is only a function of Q, which is a function of the mass flow rate. Thus in this case, where the op-amp gain is considered infinite, the direct relation between bridge voltage and mass air flow rate can be easily understood. Further, the output frequency is linearly related to the bridge voltage. Therefore, the output frequency is a direct function of the mass flow rate.

Although the approximation discussed above is reasonable, in practice the op-amp does not have an infinite gain. Therefore, a simultaneous solution of the six system equations, Equations 14–19, is required. The equations are solved by an iterative procedure. The solution procedure provides the output voltage and frequency of the mass air flow rate sensor 18 for a given mass flow rate, assuming that the ambient air temperature and the mass air flow rate sensor 18 flow tube temperature are known.

Figure 3:
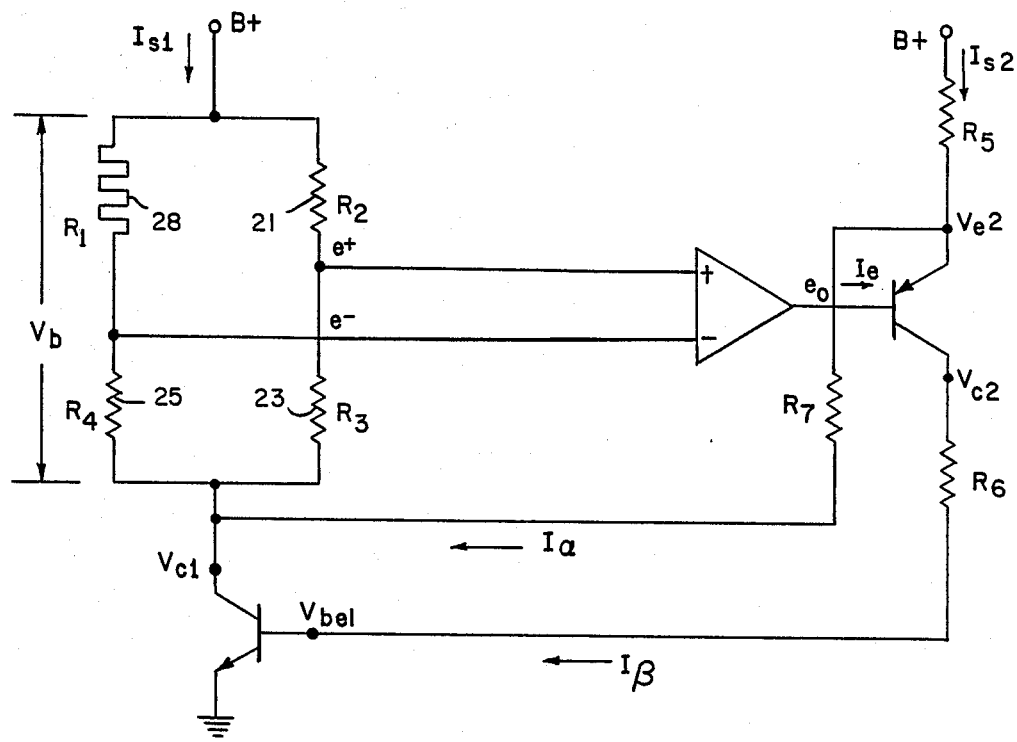
FIG. 3 is a schematic of a circuit for a prior art bridge type mass air flow rate sensor.

Throughout the remainder of the application, numerous results from computer simulations are Presented. It should be noted that the electrical circuit and the heat transfer models used to obtain these results differ somewhat from those already presented. The new electrical circuit, shown in FIG. 3, while still containing the wheatstone bridge as described previously, was selected to be more representative of circuits in use. The circuit Performance is similar to that of the simple circuit Presented earlier, and all of the performance discussion regarding that simpler circuit applies. Thus, reference will be made to the circuit shown in FIG. 2. The new heat transfer model is based on the previous model, but has been modified to agree with experimental data.

Implementation of the circuit model required specification of the parameters of bridge circuit 19. The values chosen are representative of actual values used in a mass air flow rate sensor 18. The resistances $R_2$ and $R_3$ of resistors 21 and 23 were chosen as 1352.73 and 1417.91 ohms, respectively. The resistance $R_4$ of resistor 25 was specified as 5.0281 ohms, and the foil 28 had a resistance of 4.797 ohms at a temperature of 95 degrees centigrade. The gain, A, of the op-amp 32 was 100,000. Due to the requirements of bridge balance, the bridge operates with the foil 28 at a temperature of approximately 95 degrees centigrade.

Figure 4:
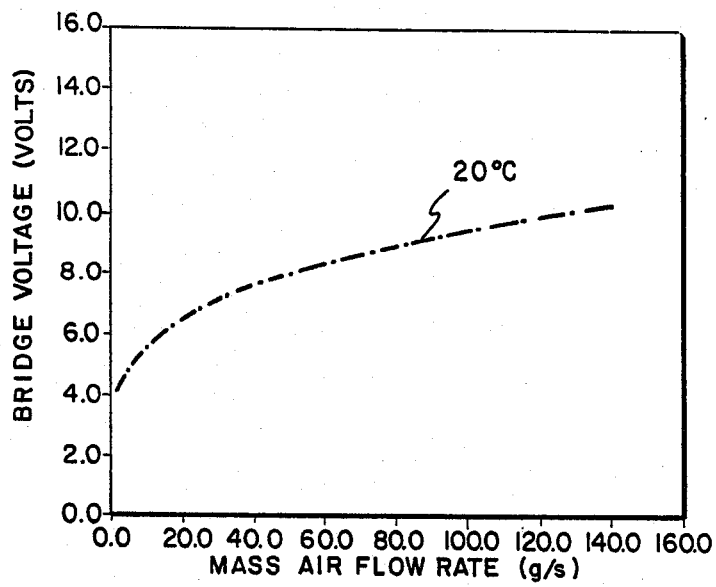
FIG. 4 is a graph of simulation results showing bridge voltage vs. mass air flow rate.

The operating range of the mass air flow rate sensor was assumed to be from 2 g/s to 140 g/s. The model of the mass air flow rate sensor was used to predict the output voltage over this flow range while holding the ambient air temperature at a constant 20 degrees centigrade. The result is shown in FIG. 4. As mentioned before, the bridge voltage is converted to a frequency to minimize noise corruption of the signal. The output frequency, as predicted by the model, is shown in FIG. 5.

Illustratively, the mass air flow rate sensor must measure mass air flows which range in temperature from $-40°$ C. to 80° C. Thus, the effect that changes in ambient air temperature have upon the output of the mass air flow rate sensor is an important consideration.

Figure 5:
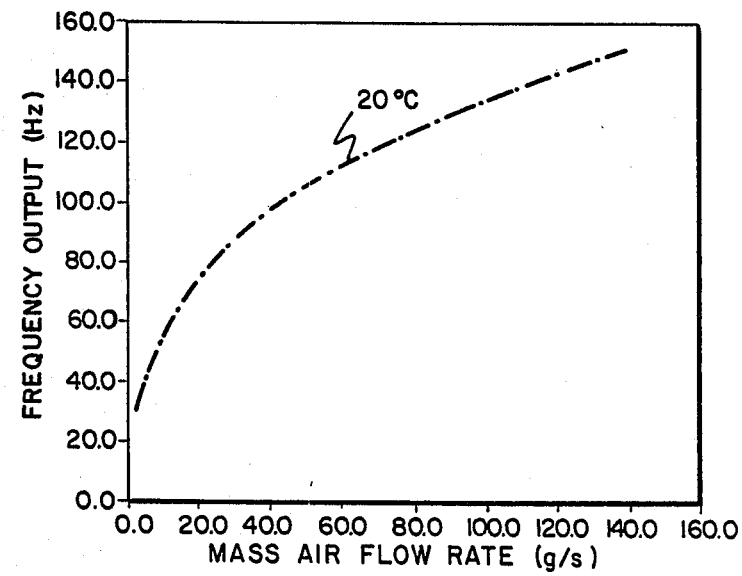
FIG. 5 is a graph of simulation results showing frequency vs. mass air flow rate.

Using the simulation, a plot of the frequency output of the mass air flow rate sensor 18 against mass air flow rate was presented in FIG. 5. In this simulation, the ambient air temperature was 20° C. Results from the same simulation at ambient air temperatures at $-40°$ C., 20°0 C. and 80° C. are shown in FIG. 6.

Figure 6:
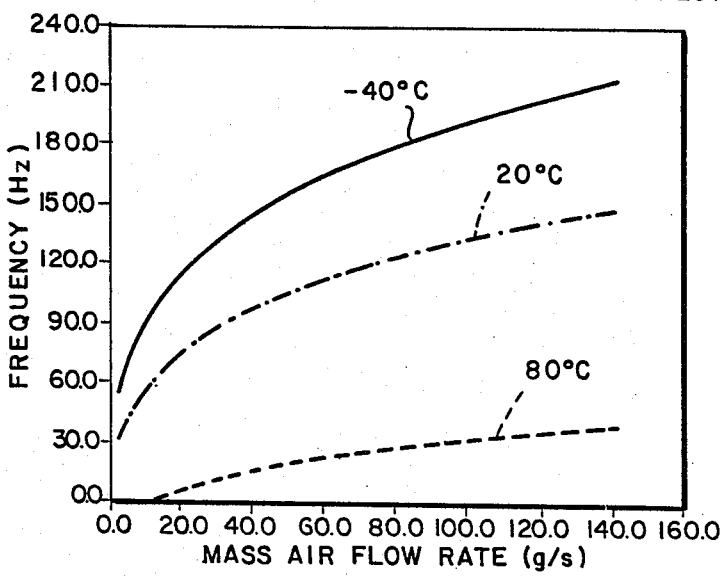
FIG. 6 is a graph of simulation results showing frequency vs. mass air flow rate at ambient air temperatures of $-40°$ C., $20°$ C. and $80°$ C.

The results presented in FIG. 6 show that at a fixed mass air flow rate, large changes in the frequency output are caused by changes in ambient air temperature. The output of the mass air flow rate sensor 18 thus depends upon not only the mass air flow rate upon the ambient air temperature. This is not desirable. This sensitivity of the output of the mass air flow rate sensor 18 to ambient temperature can be explained as follows.

First, as the bridge circuit 19 is now configured, the temperature $T_l$ does not vary as the ambient air temperature varies. The dependence of the output frequency on ambient air temperature may then be explained by examination of the simple heat transfer model written below.

$$Q(\dot{m}) = h(\dot{m})A_f(T_l - T_a) + esA_f(T_l^4 - T_s^4) \tag{24}$$

The convective heat transfer is a function of the foil temperature minus the ambient air temperature. The heat loss by radiation is a function of the temperature of foil 28 raised to the fourth power minus the surface temperature of the flow tube (100 in FIG. 18; 200 in FIG. 22) raised to the fourth power. The flow tube temperature is related to the ambient air temperature.

As the air temperature becomes higher, the heat loss by both convection and radiation will decrease. Because of the reduced heat loss, less current will be needed to maintain the temperature of foil 28. The bridge voltage, and thus the frequency output of the mass air flow rate sensor 18, will then decrease. The converse follows if the air temperature is lowered. These intuitive comments are borne out by the results shown in FIG. 6. For the mass air flow rate sensor 18 to be a useful device, some means of reducing its sensitivity to ambient temperature must be introduced. A prior art passive compensation scheme to achieve this result, called the TCOMP method, is presented below. While use of the TCOMP technique leads to significant error reduction, further error reduction is desirable, leading to the need for the error correction technique of this invention.

The dominant heat transfer mode is convection. It would appear by looking at the heat transfer model (Equation 24) that maintaining a fixed temperature difference between the foil 28 and the air would eliminate the effect of ambient air temperature variation on the convective heat transfer.

The radiative heat transfer depends upon the difference between the fourth powers of the foil and flow tube temperatures, where the flow tube temperature is dependent upon the ambient air temperature. Thus, fixing the temperature difference between the foil 28 and ambient air temperatures does not render the radiative term independent of ambient temperature variations. Rather, with respect to some reference ambient temperature, it produces a radiative heat transfer in excess of the original for increases in the ambient temperature and less than the original for decreases in the ambient temperature.

An additional source of error results from the fact that the thermal properties of air vary with temperature and are not constant as was previously assumed. The variation in the thermal properties of air directly affect the convective heat transfer coefficient, and thus the convective heat transfer. As the air temperature rises, so does the convection coefficient, giving rise to a greater amount of heat loss for a given mass air flow rate and temperature difference. As explained above, the radiative term is dependent upon the ambient temperature in the same manner.

Thus, for the case where there is a fixed temperature difference between the foil 28 and the ambient air temperature, the convective and radiative heat transfer terms still depend upon ambient temperature. As the ambient air temperature increases, both forms of heat transfer become more efficient, and the total heat transfer increases. The converse is true at low ambient temperatures. The terms low and high ambient temperatures are with respect to a reference ambient temperature of 20° C.

Reducing the temperature difference between the foil 28 and the ambient air at high ambient temperatures and increasing it at low ambient temperatures would compensate for this changing heat transfer efficiency. The variation in heat loss would be offset by the modified temperature difference and the frequency output of the bridge would become less dependent upon ambient temperatures.

Figure 7:
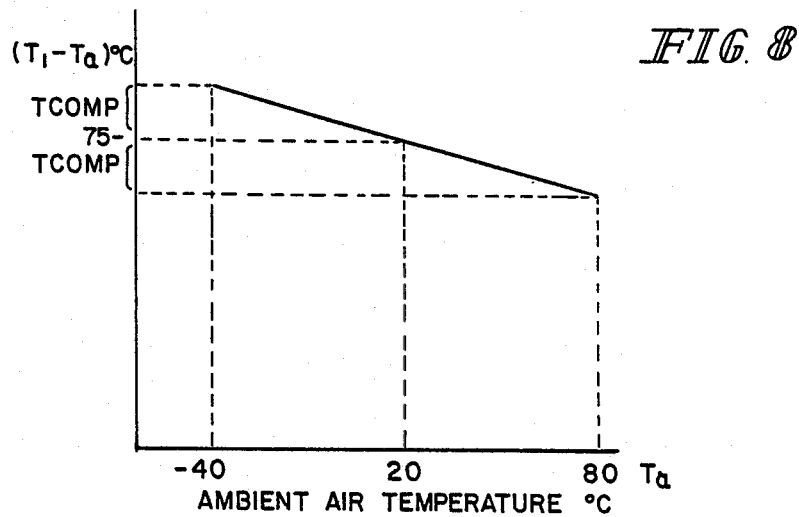
FIG. 7 is a graph of the differences between the temperatures of the element and ambient air vs. the temperature of the ambient air employed in a TCOMP temperature compensation scheme.

In accordance with the above argument, FIG. 7 provides a plot of the difference between the temperatures of foil 28 and ambient air temperatures to be employed. The maximum amount of adjustment from a constant temperature difference is termed TCOMP, and the variation of the temperature difference with ambient temperature is linear.

This type of foil 28 temperature function is achieved by allowing the resistance $R_2$ of resistor 21 to vary with ambient air temperature. Since the resistance of the foil 28 in steady state operation is determined by the values of the other bridge resistors 21, 23, 25, changing the resistance $R_2$ of resistor 21 changes the foil resistance $R_1$ at which the bridge circuit 19 balances, and thus changes the operating temperature of the foil 28.

The resistance $R_2$ is provided by two resistors. The first resistor is required to vary with ambient temperature. The second resistor is to remain constant as ambient temperature changes. While it might appear desirable to specify $R_2$ as a single temperature-dependent resistor, such a configuration would force a specified functional relation between resistance and temperature which would be a difficult constraint to satisfy when producing the device. The leg 24 of the bridge circuit 19 that contains these two resistors has a very high resistance relative to leg 20, and thus carries very little current. Therefore, the variable resistor will have a very small self-heating effect, and if placed in the air flow, it will have a temperature very near that of the air flowing through the tube.

Figure 8:
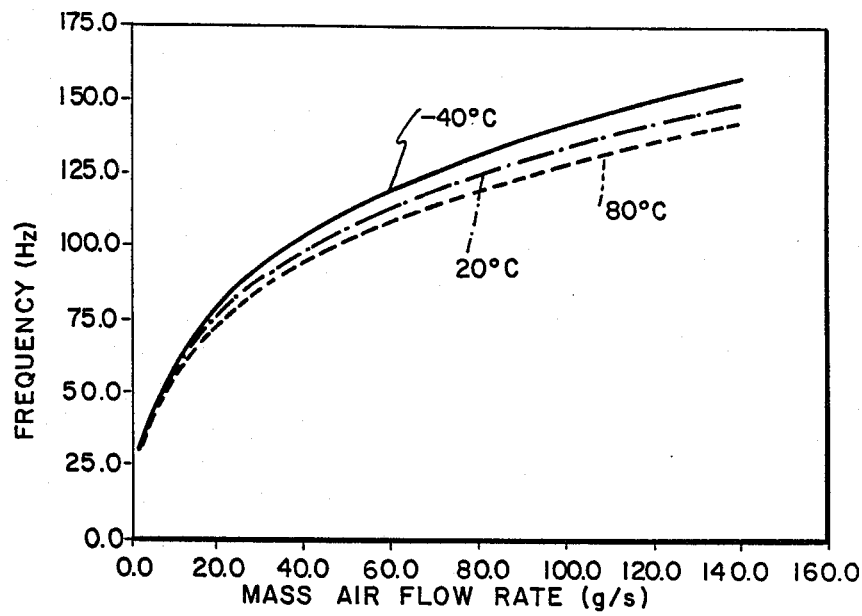
FIG. 8 is a graph of simulation results showing frequency vs. mass air flow rate for a prior art bridge type mass air flow rate sensor with TCOMP temperature compensation at the ambient air temperatures of FIG. 7.

The result of a digital computer simulation of a mass air flow rate sensor 18 is shown in FIG. 8. This result is modified to include the TCOMP temperature compensation scheme in steady state operation and with TCOMP=11° C. Results are presented for air temperatures of −40° C., 20° C. and 80° C. while the mass flow rate is varied over the operating range. Comparing the results of FIG. 8 with the uncompensated results of FIG. 6, it can be seen that the addition of the TCOMP compensation has significantly reduced the variation in output frequency due to ambient air temperature changes. Why a value of TCOMP=11°0 C. was chosen for this illustration will be discussed later.

It has been shown that the frequency output of the mass air flow rate sensor 18 will vary with ambient temperature. The frequency output of the mass air flow rate sensor 18 can also be affected by installation, aging, manufacturing tolerances and other factors. A way of relating a change in frequency output to indicated mass air flow rate error is needed. To begin, the mass air flow rate error is defined as $$MAS \text{ error} = \frac{\dot{m}_2 - \dot{m}_1}{\dot{m}_1} * 100 \quad (25)$$

where
$\dot{m}_1$ Actual mass air flow rate; and
$\dot{m}_2$ Indicated mass air flow rate.

Assume that a standard curve of frequency vs. mass air flow rate exists, and that this curve is used as the input-output relation for all mass air flow rate sensing units manufactured. If the output frequency of a standard mass air flow rate sensor under standard operating conditions is known, then the curve can be used to determine the mass air flow rate. Also assume that a particular mass air flow rate sensor has an output curve that differs from the standard curve, but that this curve is not known. When the standard curve is used to translate an output frequency of this particular mass air flow rate sensor to a mass air flow rate, a certain amount of error will result.

Figure 9:
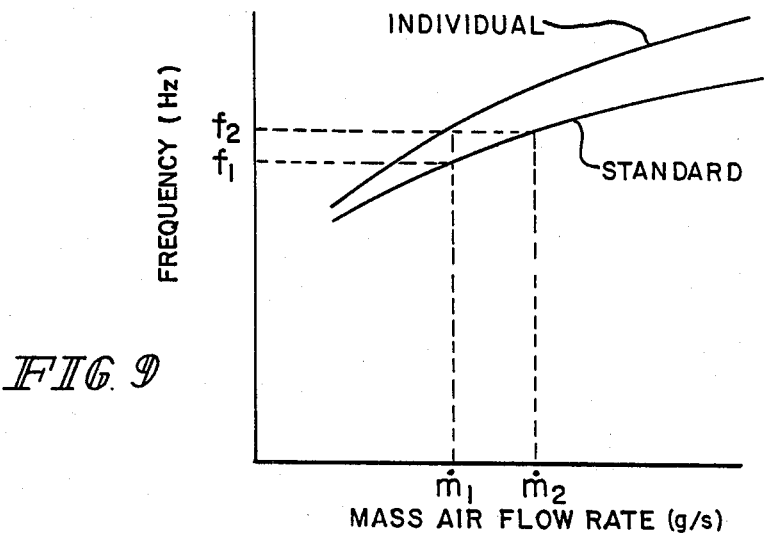
FIG. 9 is a graph of frequency vs. mass air flow rate showing a standard output curve for a prior art bridge type mass air flow rate sensor and an output curve for an individual prior art bridge type mass air flow rate sensor.

A representation of the standard output curve of a mass air flow rate sensor and a different curve which is the output curve for an individual mass air flow rate sensor are illustrated in FIG. 9. As FIG. 9 clearly shows, the individual mass air flow rate sensor will provide a different output frequency than the standard mass air flow rate sensor when subjected to a flow rate of $\dot{m}_1$. If an individual mass air flow rate sensor is tested at an air flow rate of $\dot{m}_1$ the frequency output of the device would be $f_2$ using the individual curve shown in FIG. 9. However, since only the standard input-output curve is available for converting output frequency to input mass flow rate, the frequency $f_2$ implies that a mass flow rate of $\dot{m}_2$ is being input, rather than the true flow rate of $\dot{m}_1$.

To calculate the resulting error, note that the slope of the standard curve at the test point $\dot{m}_1$ may be approximated as $$\text{slope} = \frac{f_2 - f_1}{\dot{m}_2 - \dot{m}_1} \quad (26)$$

Combining Equations 25 and 26, the error may be expressed as $$MAS \text{ error} = \frac{f_2 - f_1}{\text{slope} * \dot{m}_1} * 100 \quad (27)$$

Equation 27 can be used to determine the error caused by a change in ambient air temperature. The quantities needed for the calculation consist of $f_1$ and $f_2$, the slope of the standard curve at the calculation point, and the mass flow rate. The simulation is used to calculate the frequency $f_1$ that occurs at the mass flow rate of $m_1$ at the standard ambient temperature, as well as the slope of the standard curve at this mass air flow rate. The frequency $f_2$ that results from the mass flow rate $m_1$ at the new ambient temperature is also calculated from the simulation. All of the needed quantities are now known and the mass air flow rate error due to the ambient temperature change may be calculated using Equation 27.

Using the procedure described above, a curve of the mass air flow error vs. mass flow can be obtained for various ambient temperatures. This procedure is now used to illustrate the utility of the TCOMP temperature compensation scheme.

When the TCOMP compensation method was discussed above, the idea of holding the difference between the temperature of foil 28 and the temperature of the ambient air constant was discussed. It was argued that this would reduce the dependence of the output of the mass air flow rate sensor 18 on ambient air temperature. FIG. 7 shows that holding the temperature difference constant is identical to using the TCOMP method with the value of TCOMP=0° C.

Figure 10:
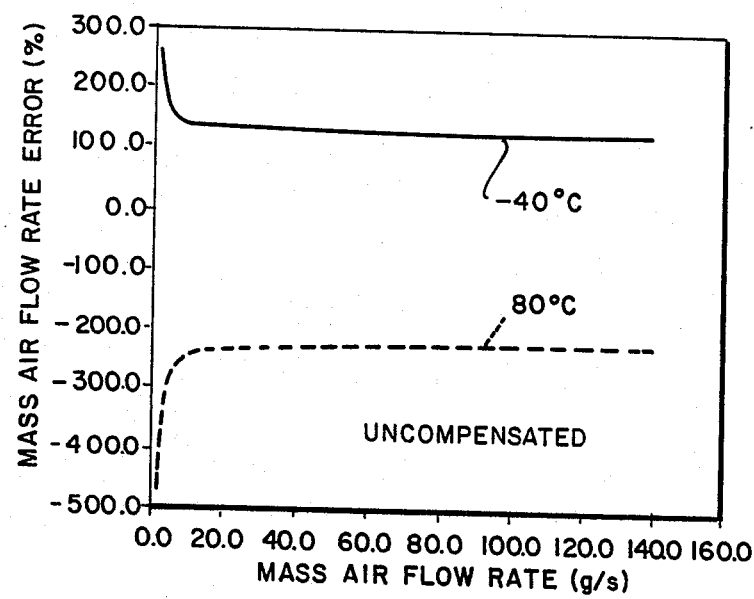
FIG. 10 is a graph of simulation results showing the mass flow rate error for an uncompensated prior art bridge type mass air flow rate sensor.
Figure 11:
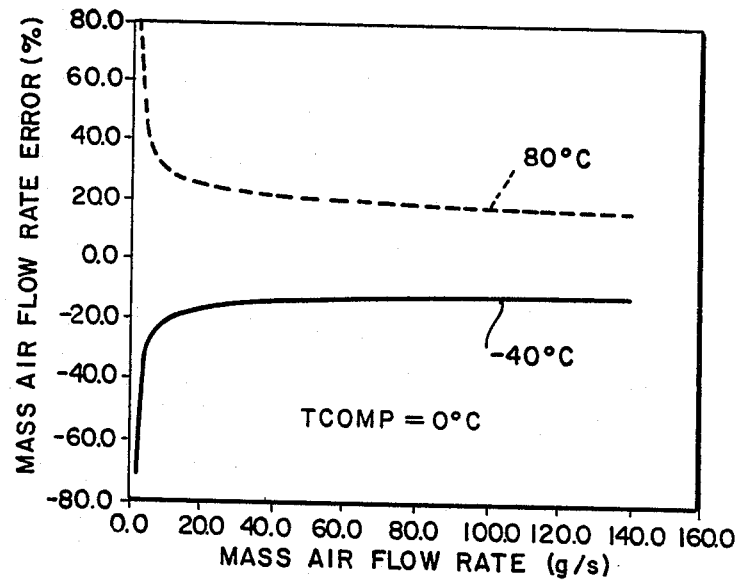
FIG. 11 is a graph of simulation results showing the mass air flow rate error for a prior art TCOMP compensated bridge type mass air flow rate sensor for ambient air temperatures of −40° C. and 80° C. wherein the TCOMP compensation is 0° C.

The indicated mass flow error of the uncompensated mass air flow rate sensor ($R_2 \neq R_2(T_a)$) is shown in FIG. 10. The two curves represent the error at the temperature extremes of −40° and 80° C. The indicated mass air flow rate error of the compensated mass air flow rate sensor with TCOMP=0° C. is presented in FIG. 11. Comparison of the two figures readily shows the reduction in error achieved by the TCOMP compensation.

As discussed, a positive value of TCOMP is needed to obtain further reduction in error. Results for values of TCOMP equal to 0, 6, 11 and 13° C. are presented in FIGS. 11–14, respectively.

As TCOMP increases from 0° C., the average error decreases and the error curves at ambient temperatures of −40° C. and 80° C. begin to move towards each other. At a value of TCOMP=6° C. (FIG. 12), the error curves have intersected. As TCOMP is increased further to 11° C. (FIG. 13), the error curves cross each other with the error at −40° C. Positive and the error at 80° C. negative at higher flow rates. As TCOMP increases still further to 13° C. (FIG. 14), the error curves continue to move further apart but the maximum error, which previously occurred at the lowest mass flow rates, decreases.

The results using TCOMP=11° C. were presented earlier because this value provides a good compromise between maximum and average error, keeping both in the ±20% range throughout the range of flow rates 2-140 g/s. Such a decision reflects a desire to balance mass air flow rate sensor error at low flow rates with mass air flow rate sensor error at high flow rates, cf. FIG. 13, across the range of ambient temperatures.

DETAILED DESCRIPTION OF AN EMBODIMENT OF THE INVENTION

Figure 14:
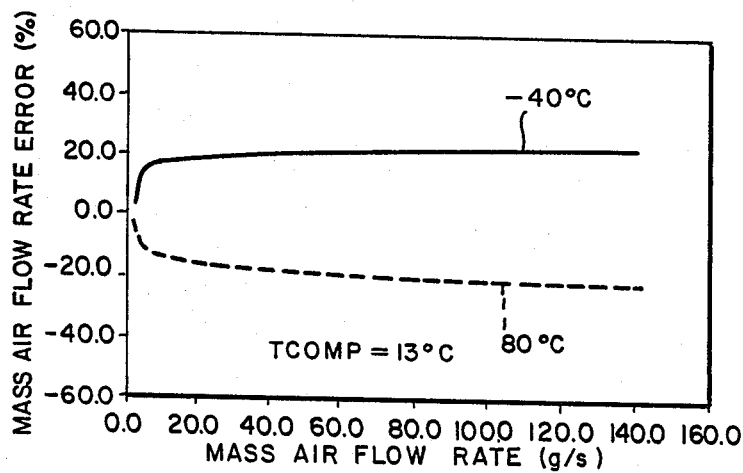
FIG. 14 is a graph of simulation results showing the mass flow rate error for a prior art TCOMP compensated bridge type mass air flow rate sensor for ambient air temperatures of −40° C. and 80° C. wherein the TCOMP compensation is 13° C.

For use in the error correction scheme of this invention, the mass air flow rate sensor error curves are further separated by using TCOMP=13° C., rather than TCOMP=11° C. The result is shown in FIG. 14. The reference ambient temperature ($T_{ar}$) for which there is no mass air flow rate sensor error is $T_{ar}=T_a=20°$ C. The reference ambient temperature is selected so that it is centrally located in the temperature range of interest across the entire mass flow rate range. From FIG. 14, it can be seen that the mass air flow rate sensor output at $T_a=40°$ C. is too high (positive error) while at $T_a=80°$ C., the mass air flow rate sensor output is too low (negative error).

Thus, modifying the bridge voltage $V_b$ by adding to it a correction voltage $V_c$ with the requirement that $$V_c > 0 \text{ for } T_a > 20° \text{ C.} \tag{28a}$$

$$V_c = 0 \text{ for } T_a = 20° \text{ C.} \tag{28a}$$

$$V_c < \text{ for } T_a = 20° \text{ C.} \tag{28a}$$

will result in decreasing the errors introduced by ambient air temperature changes. The requirement that $V_c$ be zero at $T_{ar}=20°$ C. follows from the definition of the output at the reference temperature of $T_a=20°$ C. as being the standard output against which all others are to be measured. Thus no correction voltage is required at the reference ambient air temperature.

Since the amount of correction required for ambient air temperatures other than the reference temperature can be expected to vary with both ambient air temperature and mass flow rate, $$V_{out} V_b + k(T_a, \dot{m}) V_c \tag{29}$$

The result desired is for the bridge output voltage $v_{out}$ to depend only on $\dot{m}$ and be independent of variations in the ambient temperature about the reference temperature, in this case, $T_a=20°$ C. The quantity $k(T_a,m)$ is the correction gain required to achieve this as $T_a$ and $\dot{m}$ vary.

To generate $V_c$, let $$V_c = V_1 - V_4 = I_t(R_1 - R_4) \tag{30}$$

The bridge balance relation of Equation 21 is repeated below for convenience.

$$R_1 = R_4 \frac{R_2}{R_3} \tag{31}$$

Assume that $R_1$ equals $R_4$ at the reference temperature, i.e. that $R_2$ equals $R_3$ at the reference temperature. Also, note that use of the TCOMP correction scheme yields $$R_2 = R_2(T_a) \tag{32}$$

and hence as $T_a$ increases, $R_2$ increases.

From Equations 31 and 32, it follows that as $T_a$ increases from the reference temperature, $R_1$ also increases, yielding $R_1 > R_4$. Thus for $T_a$ greater than the ambient reference temperature of 20° C., Equation 30 yields $V_c > 0$. For $T_a$ less than the reference temperature, it follows that $R_1 < R_4$ and $V_c < 0$. Finally, since $R_1 = R_4$ at the reference temperature, it follows from Equation 32 that $V_c = 0$ at this temperature. In this manner, all of the requirements for the correction voltage as specified in Equation 28 have been met.

One further refinement is required in the development of $V_c$. In general, the design and Procurement processes will cause resistances $R_1$ and $R_4$ to be unequal at the ambient air reference temperature $T_{ar}$, contrary to the assumption made above. If this is the case, then at the ambient air reference temperature, $V_c$ will not be equal to 0 as required.

To overcome this difficulty, note that at the ambient air reference temperature, $T_{ar}$, the correction voltage $V_c$ is given by, (cf. Equation 30)

$$V_c(T_{ar},\dot{m}) = V_1 - V_4 = I_t(T_{ar},\dot{m})(R_1 - R_4) \tag{33}$$

Recall also from Equation 11 that the bridge voltage $V_b$ at the reference temperature is given by $$V_b(T_{ar},\dot{m}) = V_1 + V_4 = I_t(T_{ar},\dot{m})(R_1 + R_4) \tag{34}$$

Forming the ratio of the two voltages, the current, $I_t(T_{ar},\dot{m})$, cancels yielding $$k_z = \frac{V_c(T_{ar},\dot{m})}{V_b(T_{ar},\dot{m})} = \frac{(R_1 - R_4)}{(R_1 + R_4)} \tag{35}$$

In the above expression, the only dependence of the ratio on mass flow rate is through $R_1$. This follows since $R_1$ is a function of $T_1$, and $T_1$ depends on the mass flow rate. In fact, though, this dependence is extremely small because of the high op-amp gain in the feedback circuitry, cf. FIG. 2. The ratio may therefore be taken as constant at the ambient reference temperature for all mass flow rates. This value is denoted by $k_z$ in equation 35. Then the voltage correction required to force $V_c$, as given by Equation 30, to zero at the ambient air reference temperature is determined simply by subtracting $k_z V_b$ from it, i.e., $$V_c = V_1 - V_4 - k_z V_b \quad (36)$$

In this manner, the correction voltage can be generated using any two of the existing signals $V_1$, $V_4$ and $V_b$.

ANALOG IMPLEMENTATION

All that remains to implement the scheme and generate a corrected bridge output in accordance with Equation 29 is to determine the correction gain $k(T_a, \dot{m})$ to be used. To do so, at each of a set of mass flow rates across the flow range, the correction gain that nulls the output error at the two extremes of ambient air temperatures being considered is determined. In this case, these are $T_a = 80°$ C. and $T_a = -40°$ C. Thus, the gains, which of course will vary with $\dot{m}$ are denoted by $k(80° C., \dot{m})$ and $k(-40° C., \dot{m})$ respectively.

One simple and reasonable choice for k is to use that value at each $\dot{m}$ which is the average of the values required to null the errors at the extreme temperatures, i.e.

$$k = \bar{k}(\dot{m}) = \frac{k(80° C., \dot{m}) + k(-40° C., \dot{m})}{2} \quad (37)$$

Implementation of the correction gain as determined directly from Equation 37 is certainly possible and will be discussed in the section on digital implementation.

For the moment, though, Equation 37 provides a guide to the selection of the correction gain for analog implementation. Since the correction gain is to vary with $\dot{m}$, let $k(\dot{m})$ be represented as a function of the bridge voltage $V_b$ which, of course, does vary with $\dot{m}$. Indeed, for ease of implementation, assume that a simple linear relationship will suffice.

Illustrating the procedure with application to the system modeled above, and using TCOMP = 13° C. as discussed earlier, the correction gain function is selected as $$k = \begin{cases} .20 V_b - .75 & \text{for } V_b < 6.0 \text{ volts} \\ .45 & \text{for } V_b \geq 6.0 \text{ volts} \end{cases} \quad (38)$$

Figure 16:
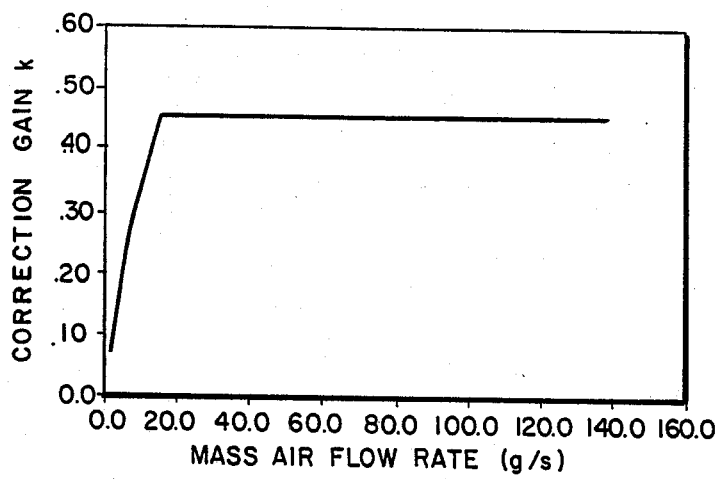
FIG. 16 is a graph of simulation results showing the relationship of correction gain determined with an analog implementation of this invention to mass air flow rate as applied to a prior art TCOMP compensated bridge type mass air flow rate sensor with a TCOMP of 13° C.

The form of k as given by Equation 38 has been chosen for ease of analog implementation. The linear variation of k with $V_b$, with k ranging from 0.07 to 0.45, occurs as the mass flow rate varies from 2 to 15 grams/sec, after which the gain is held constant. The variation of k with $V_b$ is shown in FIG. 15. The corresponding variation of k with m is shown in FIG. 16. Finally, from Equation 35

$$k_z = -0.02350 \quad (39)$$

Figure 17:
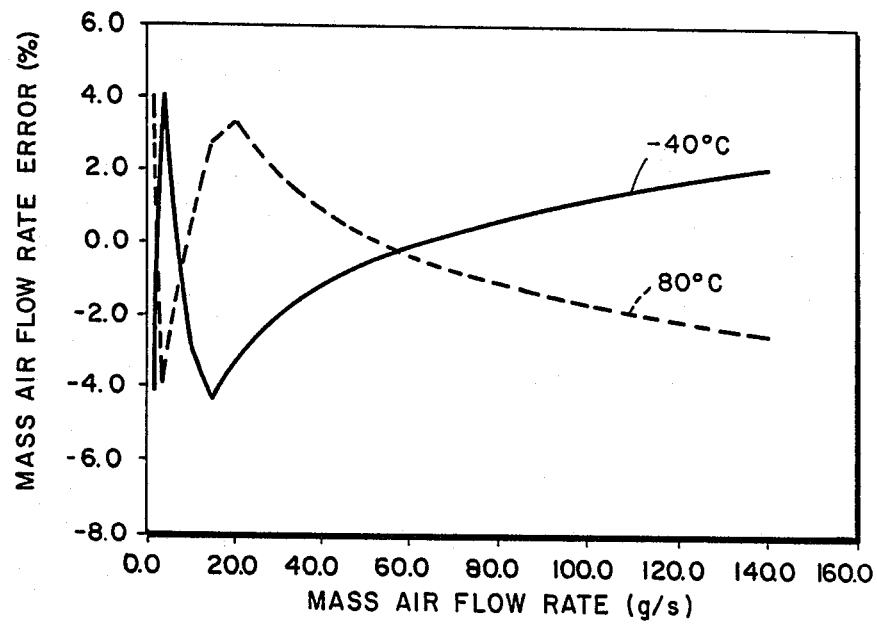
FIG. 17 is a graph of simulation results showing the mass flow rate error for a TCOMP compensated bridge type mass air flow rate sensor for ambient air temperatures of −40° C. and 80° C. wherein the TCOMP is 13° C. which utilizes an analog implementation of the temperature compensation scheme of this invention.

Using kz as just determined to form $V_c$ from Equation 36, and using $V_c$ and k from Equation 38 to generate the corrected bridge output voltage $V_{out}$ from Equation 29, the mass air flow sensor error curves shown in FIG. 17 are obtained. Significant error reduction has been obtained relative to the error shown in FIG. 13 resulting from use of the prior art and the value of TCOMP = 11° C. (In comparing the two results, note that the vertical scale of FIG. 17 is 1/10 of that used in FIG. 13.)

Figure 12:
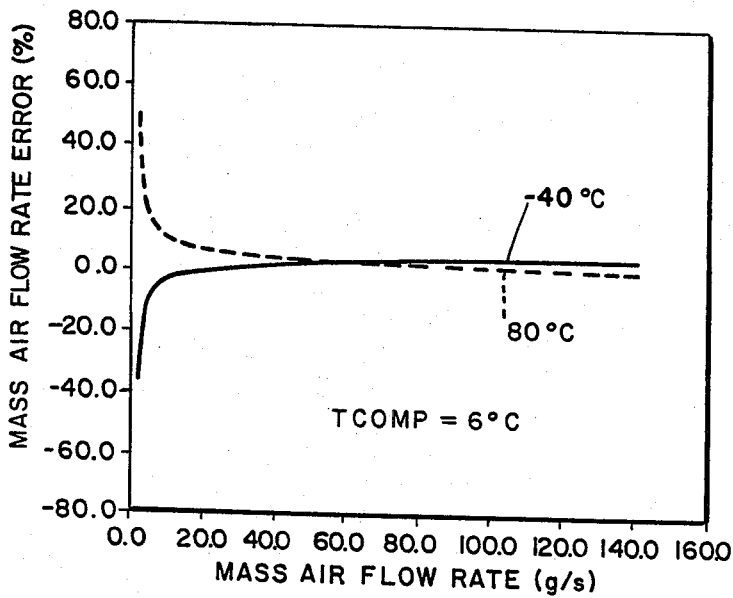
FIG. 12 is a graph of simulation results showing the mass air flow rate error for a prior art TCOMP compensated bridge type mass air flow rate sensor for ambient air temperatures of −40° C. and 80° C. wherein the TCOMP compensation is 6° C.
Figure 13:
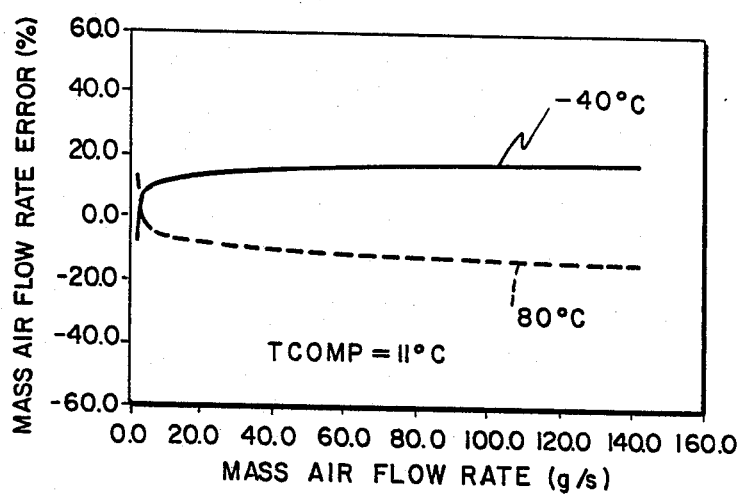
FIG. 13 is a graph of simulation results showing the mass flow rate error for a prior art TCOMP compensated bridge type mass air flow rate sensor for ambient air temperatures of −40° C. and 80° C. wherein the TCOMP compensation is 11° C.
Figure 13:
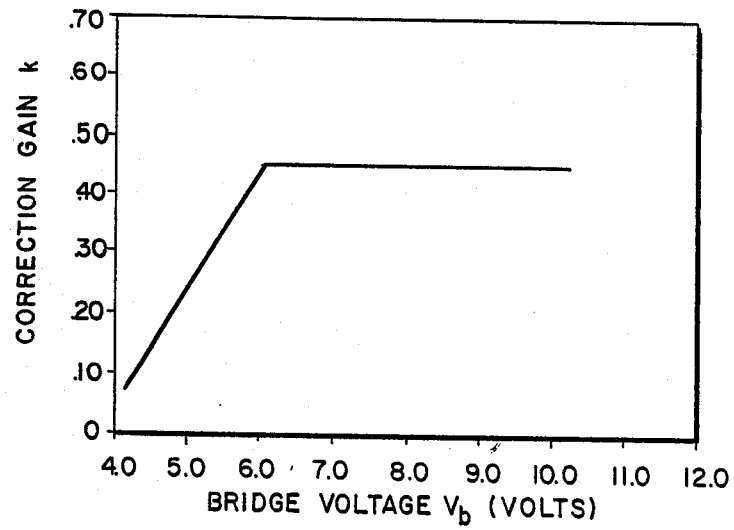

As an alternative implementation, consider the error curve resulting from use of the prior art and TCOMP = 6° as shown in FIG. 12. If the error for flow rates above approximately 50 grams/sec is acceptable, then the following approach may be employed. Note that for flows below 50 grams/sec, the output at $T_a = 80°$ C. is too high while for $T_a = -40°$ C. it is too low. Thus, the same philosophy as previously employed may be used in this case also. In this instance, the expression comparable to Equation 38 for the correction gain k would have the gain magnitude start high at the lowest flow rate and then vary linearly with bridge voltage $V_b$ down to zero at the bridge voltage associated with 50 grams/sec, after which it would retain the value of zero.

The components required to implement the correction scheme of this invention with an analog circuit are:
1. Voltage amplification with fixed gain to provide the correction voltage offset in Equation 36, given by $k_z V_b$.
2. A voltage summer to form the correction voltage $V_c$ as given by Equation 36.
3. A function generator to form the correction gain function k, cf Equation 38.
4. Analog voltage multiplication to provide the correction to the bridge voltage in Equation 29, given by $k_z V_c$.
5. A voltage summer to form the corrected bridge output voltage $V_{out}$ as given by Equation 29.

Figure 18:
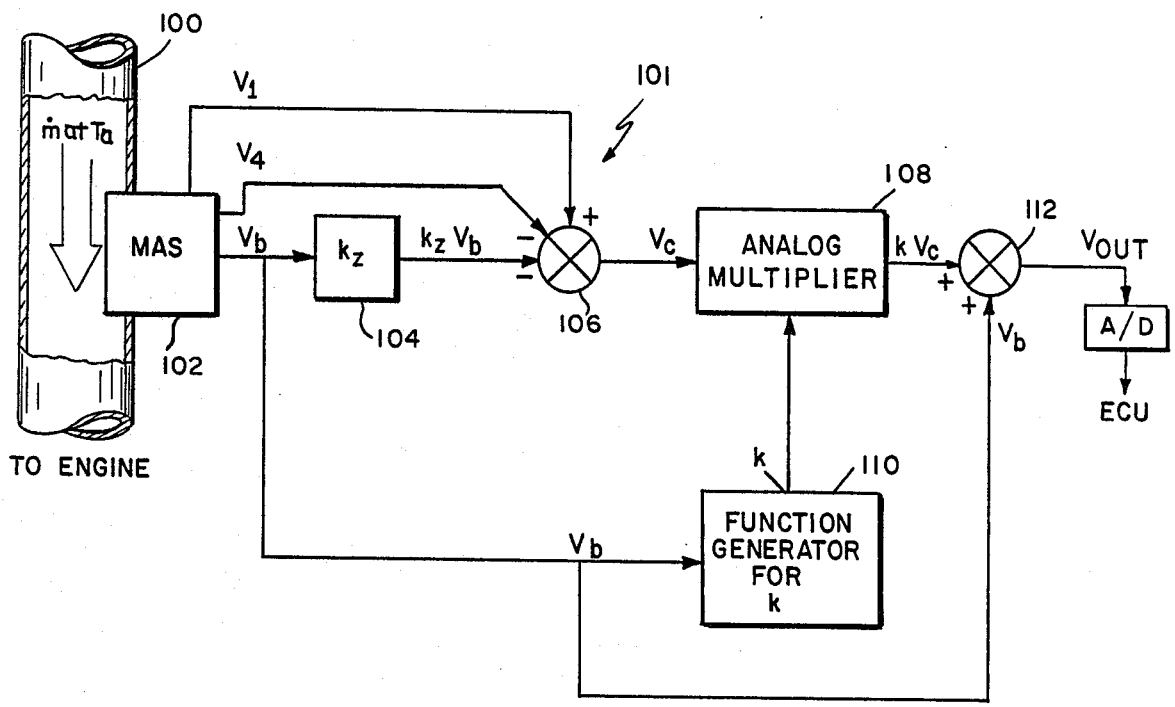
FIG. 18 is a block diagram of a system showing a TCOMP compensated bridge type mass air flow rate sensor with an analog implementation of the temperature compensation scheme of this invention.

FIG. 18 is a block diagram of an analog system implementing the correction scheme of this invention. An error correcting mass air flow rate sensor 101 includes a mass air flow rate sensor 102 with TCOMP temperature compensation. Input signals to mass air flow rate sensor 102 are ambient temperature $T_a$ and mass air flow rate $\dot{m}$. With reference to the simplified diagram of a mass air flow rate sensor shown in FIG. 2, the output signals from mass air flow rate sensor 102, $V_b$, $V_1$ and $V_4$, comprise the bridge voltage, $V_b$, the voltage across $R_1$ and the voltage across $R_4$, respectively. The bridge voltage $V_b$ is amplified by a constant gain amplifier 104 having a gain of $k_z$ to generate the correction voltage offset given by $k_z V_b$ in Equation 36. The resulting signal, $k_z V_b$ is then summed with $V_1$ and $-V_4$ by a voltage summer 106 to generate the correction voltage $V_c$ given by Equation 36.

The bridge voltage $V_b$ also comprises an input signal to a function generator 110 which determines k as a function of $V_b$. An output signal from function generator 110 is coupled to an analog multiplier 108. Analog multiplier 108 multiplies the correction voltage $V_c$ by k to generate the correction $kV_c$ to the bridge voltage $V_b$ as required by Equation 29. A voltage summer 112 sums the bridge voltage $V_b$ with the correction voltage $k V_c$ to generate the corrected bridge voltage $V_{out}$. This $V_{out}$ value is then provided to an engine control unit (not shown) which uses $V_{out}$ in an engine control strategy. Since such an engine control unit typically is digital, e.g., a microprocessor, an A/D converter may be inserted between the summer 112 and the engine control unit.

DIGITAL IMPLEMENTATION

The correction scheme of this invention can also be implemented digitally. As in the Previous section, the correction voltage of Equation 36, repeated below for convenience, $$V_c = V_1 - V_4 - k_z V_b \quad (40)$$

and the corrected bridge output voltage of Equation 29, also repeated here $$V_{out} = V_b + k(T_a, \dot{m}) V_c \quad (41)$$

are used.

The significant difference is that since the gain will be set digitally, it may be controlled much more Precisely than in the analog implementation scheme.

For comparison purposes, take as the correction gain that gain given by Equation 37. That is, as before, the average of the correct values at the two extreme temperatures is used as the gain, $$k = \bar{k}(\dot{m}) = \frac{k(80°\,C.,\dot{m}) + k(-40°\,C.,\dot{m})}{2} \quad (42)$$

Specifically, assume that the gain specified by Equation 42 has been determined at each of 15 standard flow points that span the flow range of interest. In this illustration, $\dot{m}$ ranges from 2 to 140 grams/sec. The standard flow points are characterized by the bridge voltages occurring at the flow points at the ambient air reference temperature of $T_{ar} = 20°$ C. Thus, at each of the 15 standard flow points, there is a reference bridge voltage value $V_{bref}(i)$ and a corresponding correction gain $k(i)$.

At bridge voltages between reference values, a linear variation in the gain factor with bridge voltage is assumed. Thus, in the region between the i'th and the i+1'st reference bridge voltages, the correction gain will be given by $$k = k(i) + (V_b - V_{bref}(i)) * \frac{k(i+1) - k(i)}{V_{bref}(i+1) - V_{bref}(i)} \quad (43)$$

Figure 19:
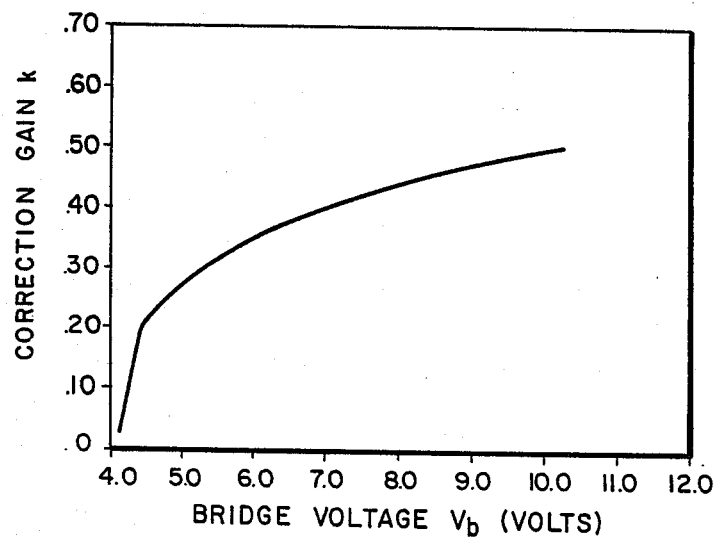
FIG. 19 is a graph of simulation results showing the relationship of correction gain determined with a digital implementation of this invention to bridge voltage as applied to a TCOMP compensated bridge type mass air flow rate sensor with a TCOMP of 13° C.
Figure 20:
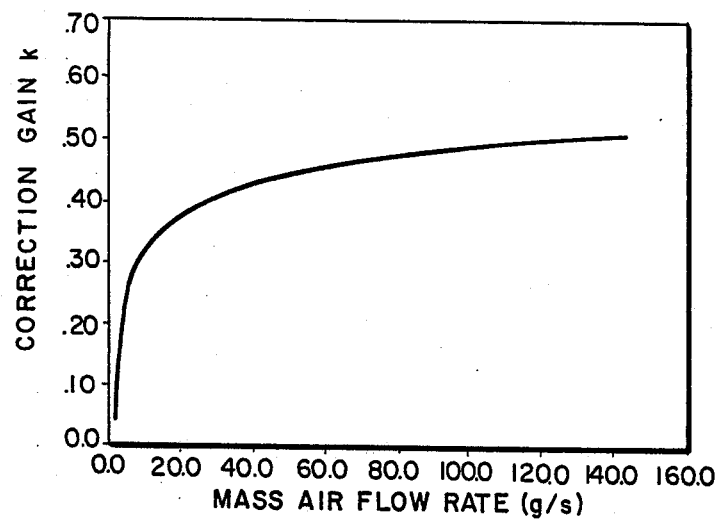
FIG. 20 is a graph of simulation results showing the relationship of correction gain determined with a digital implementation of this invention to mass air flow rate as applied to a prior art TCOMP compensated bridge type mass air flow rate sensor with a TCOMP of 13° C.

During operation, the existing bridge voltage is compared to values stored in a table and the correction gain determined by linear interpolation in accordance with Equation 43. The variation of k with $V_b$, as given by Equation 43, is shown in FIG. 19. The corresponding variation of k with $\dot{m}$ is shown in FIG. 20.

The result of using the digital Procedure on the same system used to illustrate the analog implementation (TCOMP=13° C.) is shown in FIG. 21. Considerable error reduction has occurred, even beyond that obtained using the analog implementation shown in FIG. 17.

One further enhancement is available. Note from Equation 28 that the sign of $V_c$ is positive when the ambient air temperature, $T_a$, is above the ambient air reference temperature, $T_{ar}$, and negative when $T_a$ is below the reference temperature. Thus, it is easy to implement a digital strategy using two correction gain vectors with the selection depending on the sign of $V_c$. A correspondingly enhanced error reduction can be expected because of the ability to "personalize" the correction gain vector for each ambient air temperature sub-region.

The components to implement the correction scheme of this invention digitally are:

1. An analog-to-digital converter with associated multiplexer to input two of the three voltage signals $V_1$, $V_4$ and $V_b$ to a digital logic unit.
2. A digital logic unit, such as a microprocessor, with suitable memory to process the input digital voltage signals to form the correction gain k in accordance with Equation 43, then to form the voltage correction $V_c$ in accordance with Equation 40, and then to determine the corrected bridge output voltage $V_{out}$ in accordance with Equation 41.

FIG. 22 is a block diagram of a digital system for implementing the correction scheme of this invention. An error correcting mass air flow rate sensor 201 includes a mass air flow rate sensor 202 with TCOMP temperature compensation. The input signals to mass air flow rate sensor 202 are ambient temperature $T_a$ and mass air flow rate $\dot{m}$. With reference to FIG. 2, the output signals, $V_1$ and $V_4$, from mass air flow sensor 202 comprise the voltages across $R_1$ and $R_4$, respectively. $V_1$ and $V_4$ are both coupled to multiplexer 204 which alternately provides $V_1$ and $V_4$ as inputs to analog-to-digital converter (A/D) 206. A/D 206 digitizes the $V_1$ and $V_4$ signals and provides the digital values to microprocessor 208. Microprocessor 208 includes a program which uses Equation 43 to provide a correction gain k, uses Equation 40 to provide the voltage correction $V_c$ and then uses Equation 41 to determine the corrected bridge output voltage value $V_{out}$ in the manner described above. This $V_{out}$ value is then provided to an engine control unit (not shown) which uses $V_{out}$ in an engine control strategy.

What is claimed is:

1. A bridge type mass air flow rate sensor for generating an output signal related to mass air flow rate, comprising a bridge circuit having legs;

the bridge circuit having a mass air flow rate sensing first element in a leg;

the first element comprising a first resistor, the resistance of which changes as the temperature of the element changes;

the first element responding to changes in air flow rate by changing temperature;

the bridge circuit being balanced when the first element is at a particular temperature;

the resistance of the first resistor balancing the bridge when the first element is at the Particular temperature;

an ambient air temperature sensing second element in a leg of the bridge circuit for determining the resistance of the first resistor which will balance the bridge circuit;

the second element including means for responding to changes in ambient air temperature and changing the resistance of the first element at which the bridge circuit is balanced, thus changing the particular temperature;

means for supplying operating voltage to the bridge circuit including means responsive to bridge circuit imbalances caused by changes in the resistance of the first element for changing the power supplied to the first element to maintain the first element at the particular temperature;

means for sensing the current provided to the first element and producing an output signal related to mass air flow rate sensed by the first element;

means for sensing changes in the resistance of the first element at which the bridge is balanced and producing a correction factor; and means for applying the correction factor to the output signal.

2. The apparatus of claim 1 wherein the bridge circuit comprises first and second series connected legs which are connected in parallel with third and fourth series connected legs, one of the first and second legs comprising the first element and one of the third and fourth legs comprising the second element.

3. The apparatus of claim 2 wherein the second, third and fourth legs comprise second, third and fourth resistors, respectively, the resistance of the first element at which the bridge circuit is balanced is determined by resistances of the second, third and fourth resistors, the ambient air temperature sensing element comprises one of the second, third and fourth resistors which has a resistance which changes with temperature, and the means for changing the resistance of the first element at which the bridge circuit is balanced comprises the said one of the second, third and fourth resistors.

4. The apparatus of claim 3 wherein the means for sensing changes in the resistance of the first element at which the bridge is balanced and producing the correction factor includes means for sensing voltage drops across a plurality of the legs of the bridge circuit and for combining the sensed voltage drops to produce the correction factor.

5. The apparatus of claim 3 wherein the first leg of the bridge circuit comprises the first element and the third leg of the bridge circuit comprises the second element.

6. The apparatus of claim 5 wherein the means for sensing changes in the resistance of the first element at which the bridge is balanced and for generating a correction factor includes means for sensing a first voltage across at least a portion of one of the first and second legs of the bridge circuit, means for sensing a second voltage across at least a portion of the other of the first and second legs of the bridge circuit, and means for combining the first and second sensed voltages.

7. The apparatus of claim 6 wherein the means for sensing the current Provided to the first element and generating an output signal comprises means for sensing the current provided to the first element and generating an output signal related to the mass air flow rate sensed by the first element, and the means for applying the correction factor to the output signal comprises means for combining the output signal with the correction factor to produce a corrected output signal.

8. A bridge type mass air flow rate sensor for generating an output signal related to mass air flow rate, comprising a bridge circuit having first and second series connected legs connected in parallel with third and fourth series connected legs;

the first leg of the bridge circuit including an element for sensing mass air flow rate, the element having a resistance which changes with the element's temperature;

the third leg of the bridge circuit including an ambient air temperature sensing element having a resistance which changes with ambient air temperature;

the mass air flow rate sensing element having a particular resistance at a particular temperature which is at least partially determined by the resistance of the ambient air temperature sensing element;

means for providing current to the mass air flow rate sensing element including means responsive to bridge circuit imbalances caused by changes in the resistance of the mass air flow rate sensing element for increasing and decreasing the current provided to the mass air flow rate sensing element to maintain the mass air flow rate sensing element at the particular temperature at which the bridge is balanced;

means for sensing the current provided to the mass air flow rate sensing element and producing an output signal related to mass air flow rate sensed by the mass air flow rate sensing element;

means for sensing changes in the particular resistance of the mass air flow rate sensing element at which the bridge circuit is balanced and producing a correction factor; and means for applying the correction factor to the output signal.

9. The apparatus of claim 8 wherein the means for sensing changes in the resistance of the mass air flow rate sensing element at which the bridge circuit is balanced comprises means for sensing two voltages provided by two legs of the bridge circuit and combining the sensed voltages to produce the correction factor.

10. The apparatus of claim 8 wherein the means for sensing changes in the resistance of the mass air flow rate sensing element at which the bridge circuit is balanced comprises means for sensing a first voltage generated in the first and second legs of the bridge circuit, means for sensing a second voltage generated in one of the first and second legs, and means for combining the first and second voltages to produce the correction factor.

11. The apparatus of claim 8 wherein the means for sensing changes in the resistance of the mass air flow rate sensing element at which the bridge circuit is balanced comprises means for sensing a first voltage generated in the first leg of the bridge circuit, means for sensing a second voltage generated in the second leg of the bridge circuit, and means for combining the first and second voltages to produce the correction factor.

12. In a bridge type mass air flow rate sensor for providing an output signal related to mass air flow rate, the sensor having a bridge circuit with first and second series connected legs connected in parallel with third and fourth series connected legs, an ambient air element in a leg of the bridge, the ambient air temperature sensing element having a resistance which changes with temperature, an element for sensing mass air flow rate, the mass air flow rate sensing element having a resistance which changes with temperature, the bridge circuit being balanced when the mass air flow rate sensing element has a resistane corresponding to a particular temperature, the resistance of the mass air flow rate sensing element determined in Part by the resistance of the ambient air temperature sensing element, means for providing current to the mass air flow rate sensing element, the current Providing means including means responsive to imbalances in the bridge circuit caused by changes in the resistance of the mass air flow rate sensing element, for changing the current provided to the mass air flow rate sensing element to maintain the mass air flow rate sensing element at the particular temperature at which the bridge is balanced, means for sensing the current provided to the mass air flow rate sensing element and producing an output signal related to mass air flow rate sensed by the mass air flow rate sensing element, the improvement comprising means for sensing the changes in the resistance of the mass air flow rate sensing element at which the bridge is balanced and producing a correction factor therefrom, and means for applying the correction factor to the output signal.

13. A mass flow rate sensor (8, 18, 102, 202) for providing an output signal ($V_{out}$) related to mass flow rate ($\dot{m}$) past the sensor (8, 18, 102, 202) comprising first means (19, 102, 202) for generating a first mass flow rate-related signal ($V_b$), the first signal ($V_b$) containing temperature-related errors (e.g., $T_f$-$T_a$, $T_f$-$T_s$($T_a$)) and mass flow rate-related errors (MAS error), second means ($R_2$) for generating a second signal ($R_2(T_a)$) providing temperature error correction (TCOMP), third means ($R_1$, $R_4$) for generating a third signal ($V_c$) providing mass flow rate ($\dot{m}$) error (MAS error) correction, and means (19; 30; 32; 34; 36; 38; 40; B+; in FIG. 18: 102; 104; 106; 108; 110; 112; and in FIG. 22: 202; 204; 206; 208) for operatively coupling the first (19, 102, 202), second ($R_2$) and third ($R_1$, $R_4$) means together to provide the output signal ($V_{out}$).

14. Te sensor (8, 18, 102, 202) of claim 13 comprising an internal combustion engine air intake (100 in FIG. 18; 200 in FIG. 22) and means for mounting the sensor (8, 18, 102, 202) in the intake (100 in FIG. 18; 200 in FIG. 22).

15. The sensor of claim 13 wherein the means (19; 30; 32; 34; 36; 38; 40; B+; in FIG. 18: 102; 104; 106; 108; 110; 112; and in FIG. 22: 202; 204; 206; 208) for operatively coupling the first (19, 102, 202), second ($R_2$) and third ($R_1$, $R_4$) means together to provide the output signal ($V_{out}$) comprises a bridge circuit (19, 102, 202).

16. The sensor (8, 18, 102, 202) of claim 15 wherein the bridge circuit (19, 102, 202) comprises first (20), second (22), third (24) and fourth (26) legs, provided with first (28-$R_1$), second (21-$R_2$), third (23-$R_3$) and fourth (25-$R_4$) resistive circuit components, the first means (19, 102, 202) comprising the first resistive component (28-$R_1$), the second means ($R_2$) comprising the second resistive component (21-$R_2$) and the third means ($R_1$, $R_4$) comprising the fourth (25-$R_4$) resistive component.

17. The sensor (8, 18, 102, 202) of claim 16 wherein the means (19; 30; 32; 34; 36; 38; 40; B+; in FIG. 18: 102; 104; 106; 108; 110; 112; and in FIG. 22: 202; 204; 206; 208) for operatively coupling the first (102), second ($R_2$) and third ($R_1$, $R_4$) means together further comprises means (104) for multiplying the first signal ($V_b$) by a first multiplier ($k_z$), means (110) for generating a second multiplier (k), means for coupling the first means (102) to the means (104) for multiplying the first signal ($V_b$), first means (106) for combining signals ($V_1$, $V_4$, $k_zV_b$), means for coupling the means (104) for multiplying the first signal ($V_b$) to the first combining means (106), means for coupling the third means ($R_1$, $R_4$) to the first combining means (106), the first combining means (106) generating the third signal ($V_c$), means (108) for multiplying the third signal ($V_c$) by the second multiplier (k), second means (112) for combining signals ($V_b$, $kV_c$), means for coupling the means (108) for multiplying the third signal ($V_c$) by the second multiplier (k) to the second combining means (112), and means for coupling the first signal ($V_b$) to the second combining means (112), the second combining means (112) generating the output signal ($V_{out}$).

18. The sensor (8, 18, 102, 202) of claim 16 wherein the means (19; 30; 32; 34; 36; 38; 40; B+; in FIG. 18: 102; 104; 106; 108; 110; 112; and in FIG. 22: 202, 204, 206, 208) for operatively coupling the first (202), second ($R_2$) and third ($R_1$, $R_4$) means together further comprises an analog-to-digital (A/D) converter (206), means (204) for alternately gating signals ($V_1$, $V_4$) related to the first ($V_b$) and third ($V_c$) signals to the A/D converter (206), means for coupling the A/D converter (206) to the gating means (204), means (208) for calculating the output signal ($V_{out}$) and means for coupling the A/D converter (206) to the means (208) for calculating the output signal ($V_{out}$).

19. A method for providing an output signal ($V_{out}$) related to mass flow rate ($\dot{m}$) comprising generating a first mass flow rate-related signal ($V_b$), the first signal ($V_b$) containing temperature-related errors (e.g., $T_f$-$T_a$, $T_f$-$T_s$ ($T_a$)) and mass flow rate-related errors (MAS error), generating a second signal ($R_2(T_a)$) providing temperature error correction (TCOMP), generating a third signal (Vc) providing mass flow rate ($\dot{m}$) error (MAS error) correction, and combining (19; 30; 32; 34; 36; 38; 40; B+; in FIG. 18: 102; 104; 106; 108; 110; 112; and in FIG. 22: 202; 204; 206; 208) the first ($V_b$), second ($R_2(T_a)$) and third ($V_c$) signals together to provide the output signal ($V_{out}$).

20. The method of claim 19 and further comprising the step of mounting a mass flow rate (m) sensor (8, 18, 102, 202) in an internal combustion engine air intake (100 in FIG. 18; 200 in FIG. 22).

21. The method of claim 19 wherein the step of combining (19; 30; 32; 34; 36; 38; 40; B+; in FIG. 18: 102; 104; 106; 108; 110; 112; and in FIG. 22: 202; 204; 206; 208) the first ($V_b$), second ($R_2(T_a)$) and third ($V_c$) signals to provide the output signal ($V_{out}$) comprises the step of providing a bridge circuit (19, 102, 202).

22. The method of claim 21 wherein the bridge circuit (19, 102, 202) comprises first (20), second (22), third (24) and fourth (26) legs, provided with first (28-$R_1$), second (21-$R_2$), third (23-$R_3$) and fourth (25-$R_4$) resistive circuit components, the step of providing a first signal ($V_b$) comprises the step of generating a voltage across the first resistive component (28-$R_1$), the step of providing a second signal ($R_2(T_a)$) comprises the step of generating a voltage across the second resistive component (21-$R_2$) and the step of providing a third signal ($V_c$) comprises the step of generating a voltage across the fourth (25-$R_4$) resistive component.

23. The method (8, 18, 102, 202) of claim 22 wherein the step of combining (19; 30; 32; 34; 36; 38; 40; B+; in FIG. 18: 102; 104; 106; 108; 110; 112; and in FIG. 22: 202; 204; 206; 208) the first ($V_b$), second ($R_2(T_a)$) and third ($V_c$) signals further comprises the steps of multiplying (104) the first signal ($V_b$) by a first multiplier ($k_z$), generating (110) a second multiplier (k), combining (106) signals ($V_1$, $V_4$, $k_zV_b$) related to the first ($V_b$), second ($R_2(T_a)$) and third ($V_c$) signals, generating (106) the third signal ($V_c$), multiplying (108) the third signal ($V_c$) by the second multiplier (k), combining (112) signals ($V_b$, $kV_c$) related to the first and third signals, and generating (112) the output signal ($V_{out}$).

24. The method of claim 22 wherein the step of combining (19; 30; 32; 34; 36; 38; 40; B+; in FIG. 18: 102; 104; 106; 108; 110; 112; and in FIG. 22: 202; 204; 206; 208) the first ($V_b$), second ($R_2(T_a)$) and third ($V_c$) signals further comprises the steps of alternately gating (204) signals ($V_1$, $V_4$) related to the first ($V_b$) and third ($V_c$) signals, analog-to-digital converting (206) the alternately gated (204) signals ($V_1$, $V_4$), and calculating (208) the output signal ($V_{out}$) from the alternately gated (204) related signals ($V_1$, $V_4$).

* * * * *

UNITED STATES PATENT AND TRADEMARK OFFICE
CERTIFICATE OF CORRECTION

PATENT NO. : 4,807,151

DATED : February 21, 1989

INVENTOR(S) : Stephen J. Citron

It is certified that error appears in the above-identified patent and that said Letters Patent is hereby corrected as shown below:

On the bibliography page, at "OTHER PUBLICATIONS", line 10, please delete "Saver" and insert therefor --Sauer--;

On the bibliography page, at "OTHER PUBLICATIONS", line 10, please delete "Motor" and insert therefor --Meter--;

At column 2, line 45, please delete "Prior" and insert therefor --prior--;

At column 5, line 12, please delete "m" and insert therefor --$\dot{m}$--;

At column 5, line 19, please delete "Predict" and insert therefor --predict--;

At column 5, Equation (2), please delete "$Q(\dot{m}) = I_1 R_1$" and insert therefor
$$--Q(\dot{m}) = I_1^2 R_1 --;$$

At column 6, line 21, please delete "Purposes" and insert therefor --purposes--;

At column 6, line 63, after the word "this", please insert --point.--;

At column 7, line 13, please delete "oP-amp" and insert therefor --op-amp--;

At column 7, line 17, please delete "$e_o 32\ V_B$" and insert therefor --$e_o = v_B$--;

UNITED STATES PATENT AND TRADEMARK OFFICE
CERTIFICATE OF CORRECTION

PATENT NO. : 4,807,151

DATED : February 21, 1989

INVENTOR(S) : Stephen J. Citron

It is certified that error appears in the above-identified patent and that said Letters Patent is hereby corrected as shown below:

At column 7, please delete Equation (15) and insert therefor

--$Q(\dot{m}) = h(\dot{m}) A_f (T_1 - T_a) + e s A_f (T_1^4 - T_s^4)$--;

At column 7, please delete Equation (16) and insert therefor

--$Q(\dot{m}) = I_1^2 R_1$--;

At column 8, line 10, please delete "m" and insert therefor --$\dot{m}$--;

At column 8, line 65, after "$R_4$", please insert --.-- (period);

At column 9, line 17, please delete "Presented" and insert therefor --presented--;

At column 9, line 24, please delete "Performance" and insert therefor --performance--;

At column 9, line 24, please delete "Pres-" and insert therefor --pres---;

At column 9, line 62, please delete "20°0 C." and insert therefor --20° C.--;

At column 11, line 59, please delete "11°0 C." and insert therefor --11° C.--;

UNITED STATES PATENT AND TRADEMARK OFFICE
CERTIFICATE OF CORRECTION

PATENT NO. : 4,807,151

DATED : February 21, 1989

INVENTOR(S) : Stephen J. Citron

It is certified that error appears in the above-identified patent and that said Letters Patent is hereby corrected as shown below:

At column 12, please delete Equation (26) and insert therefor $$\text{--slope} = \frac{f_2 - f_1}{\dot{m}_2 - \dot{m}_1} \text{--};$$

At column 12, please delete Equation (27) and insert therefor $$\text{--MAS error} = \frac{f_2 - f_1}{\text{slope} * \dot{m}_1} * 100\text{--};$$

At column 12, line 56, please delete "$m_1$" and insert therefor --$\dot{m}_1$--;

At column 12, line 59, please delete "$m_1$" and insert therefor --$\dot{m}_1$--;

At column 13, line 28, please delete "Positive" and insert therefor --positive--;

At column 13, line 50, please delete "Tar = Ta = 20° C" and insert therefor --$T_{ar} = T_a = 20°$ C--;

At column 13, line 55, please delete "$T_a = 40°C$" and insert therefor --$T_a = -40°C$--;

At column 13, at Equation (28a) (second occurrence), please delete "(28a)" and insert therefor --(28b)--;

UNITED STATES PATENT AND TRADEMARK OFFICE
CERTIFICATE OF CORRECTION

PATENT NO. : 4,807,151
DATED : February 21, 1989
INVENTOR(S) : Stephen J. Citron It is certified that error appears in the above-identified patent and that said Letters Patent is hereby corrected as shown below:

At column 13, please delete Equation (28a) (third occurrence), and insert therefor $$--V_c < 0 \text{ for } T_a < 20°C \qquad (28c)--;$$

At column 14, please delete Equation (29) and insert therefor $$--V_{out} = V_b + k(T_a, \dot{m}) V_c --;$$

At column 14, line 14, please delete "$k(T_a,m)$" and insert therefor $--k(T_a,\dot{m})--$;

At column 14, line 44, please delete "Procurement" and insert therefor --procurement--;

At column 14, Equation (33), please delete "(33" and insert therefor --(33)--;

At column 15, line 18, after "rates", please insert --, $\dot{m}$,--;

At column 15, line 63, please delete "kz" and insert therefor --$k_z$--;

At column 16, line 32, please delete "$k_z V_c$" and insert therefor --$k V_c$--;

At column 17, line 4, please delete "Previous" and insert therefor --previous--;

At column 17, line 17, please delete "Precisely" and insert therefor --precisely--;

UNITED STATES PATENT AND TRADEMARK OFFICE
CERTIFICATE OF CORRECTION

PATENT NO. : 4,807,151

DATED : February 21, 1989

INVENTOR(S) : Stephen J. Citron

It is certified that error appears in the above-identified patent and that said Letters Patent is hereby corrected as shown below:

At column 17, please delete Equation (42) and insert therefor $$--k = \bar{k}(\dot{m}) = \frac{k(80^\circ C, \dot{m}) + k(-40^\circ C, \dot{m})}{2} --;$$

At column 17, line 32, before the word "occurring", please insert $--V_b--$;

At column 17, line 52, please delete "Procedure" and insert therefor --procedure--;

At column 18, line 49, please delete "Particular" and insert therefor --particular--;

At column 19, line 44, please delete "Provided" and insert therefor --provided--;

At column 20, line 55, please delete "resistane" and insert therefor --resistance--;

At column 20, line 57, please delete "Part" and insert therefor --part--;

At column 20, line 60, please delete "Providing" and insert therefor --providing--;

At column 21, line 11, please delete "(m)" and insert therefor $--(\dot{m})--$;

UNITED STATES PATENT AND TRADEMARK OFFICE
CERTIFICATE OF CORRECTION

PATENT NO. : 4,807,151
DATED : February 21, 1989
INVENTOR(S) : Stephen J. Citron It is certified that error appears in the above-identified patent and that said Letters Patent is hereby corrected as shown below:

At column 21, line 14, please delete "(e.g., $T_1-T_a$, $T_1-T_s$ ($T_a$))" and insert therefor
--(e.g., $T_1-T_a$, $T_1^4-T_s^4$ ($T_a$))--;

At column 21, line 25, please delete "Te" and insert therefor --The--;

At column 22, line 16, please delete "$T_1-T_s(T_a)$)" and insert therefor
--$T_1^4-T_s^4$ ($T_a$))--;

At column 22, line 19, please delete "(Vc)" and insert therefor --($V_c$)--; and At column 22, line 26, please delete "(m)" and insert therefor --($\dot{m}$)--.

Signed and Sealed this

Nineteenth Day of September, 1989

Attest:

DONALD J. QUIGG

*Attesting Officer*    *Commissioner of Patents and Trademarks*